(12) United States Patent
Citta et al.

(10) Patent No.: US 7,305,026 B1
(45) Date of Patent: Dec. 4, 2007

(54) MULTIPATH GHOST ELIMINATING EQUALIZER WITH OPTIMUM NOISE ENHANCEMENT

(75) Inventors: Richard W. Citta, Oak Park, IL (US); Scott M. LoPresto, Mt. Prospect, IL (US); Jingsong Xia, Mundelein, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/545,597

(22) Filed: Apr. 7, 2000

(51) Int. Cl.
*H03H 7/30* (2006.01)
*H03H 7/40* (2006.01)
*H03K 5/159* (2006.01)

(52) U.S. Cl. .................. 375/229; 375/232; 375/233; 375/345; 375/348; 375/350

(58) Field of Classification Search ............... 375/225, 375/232, 346, 355, 347, 350, 340, 222, 270, 375/233, 343, 345, 348, 229
See application file for complete search history.

(56) References Cited

U.S. PATENT DOCUMENTS

| | | | | |
|---|---|---|---|---|
| 4,411,000 A | * | 10/1983 | Kustka | ................... 375/229 |
| 5,483,557 A | | 1/1996 | Webb | |
| 5,838,744 A | * | 11/1998 | Zheng | .................... 375/355 |
| 5,844,941 A | * | 12/1998 | Mack et al. | ............. 375/232 |
| 5,909,466 A | | 6/1999 | Labat et al. | |
| 6,104,769 A | * | 8/2000 | Rainish | ................... 375/355 |
| 6,240,133 B1 | * | 5/2001 | Sommer et al. | ............ 375/232 |
| 6,442,221 B1 | * | 8/2002 | Citta et al. | .................. 375/346 |
| 6,731,682 B1 | * | 5/2004 | Citta et al. | .................. 375/232 |
| 6,754,262 B1 | * | 6/2004 | Citta et al. | .................. 375/232 |
| 6,904,085 B1 | * | 6/2005 | Citta et al. | .................. 375/232 |

FOREIGN PATENT DOCUMENTS

| | | |
|---|---|---|
| WO | WO 00 60822 | 10/2000 |
| WO | WO 01 39446 | 5/2001 |

OTHER PUBLICATIONS

Sehier, P., et al., *Performance Evaluation of an Oversampled Rake Receiver*, Proceedings of the Military Communications Conference (Milcom), Long Branch, N.J., 10/2-5/94, New York, IEEE, U.S., vol. 2, Oct. 2, 1994, pp. 410-414, XP000505914.

(Continued)

*Primary Examiner*—Ted Wang

(57) ABSTRACT

An equalizer for processing blocks of data includes n−1 data shifters, n finite filters, an adder, and a controller. Each of the n−1 data shifters shifts the blocks of data. One of the n finite filters applies a corresponding set of finite filter coefficients to the blocks of data, and each of the other n−1 finite filters applies a set of finite filter coefficients to a corresponding output of the n−1 data shifters. Ghosts of the blocks of data are not eliminated as a result of the application of the n sets of finite filter coefficients corresponding to the n finite filters, and n>2. The adder is arranged to add outputs from the n finite filters. The controller is arranged to control the sets of finite filter coefficients corresponding to the n finite filters so that the addition performed by the adder substantially eliminates the ghosts.

93 Claims, 13 Drawing Sheets

OTHER PUBLICATIONS

Oguz, Sunay M., et al., *Probability of Error for Diversity Combining in DS CDMA Systems with Synchronization Errors*, European Transactions on Telecommunications, Eurel Publication, Milano, IT, vol. 9, No. 5, Sep. 1, 1998, pp. 449-463, XP000782806.

Abeta, S., et al., *Performance Comparison Between Time-Multiplexed Pilot Channel and Parallel Pilot Channel for Coherent Rake Combining in DS-CDMA Mobile Radio*, IEICE Transactions on Communications, Institute of Electronics Information and Comm. Eng., Tokyo, JP, vol. E81-B, No. 7, Jul. 1, 1998, pp. 1417-1425, XP000790175.

Albonico, D., et al., *Test of an High Data Rate Acoustic Link in Shallow Water*, IEEE Oceanic Engineering Society, Ocean Conference Proceedings, vol. 2, Sep. 28, 1998, pp. 1028-1032, XP002144348.

Despins, C. L. B., et al., *Compounds Strategies of Coding, Equalization, and Space Diversity for Wide-Band TDMA Indoor Wireless Channels*, IEEE Transactions on Vehicular Technology, IEEE Inc., New York, U.S., vol. 41, No. 4, Nov. 1, 1992, pp. 369-379, XP000362350.

McAuliffe, G. K., *Pratical Adaptive Equalizers for Data Transmission*, Wescon Technical Papers, Western Periodicals Co., North Hollywood, U.S., no. Part 3, Aug. 1, 1969, pp. 11-3-1-11-3-5, XP000760667.

International Search Report in PCT/US01/07595 dated Sep. 27, 2001.

* cited by examiner

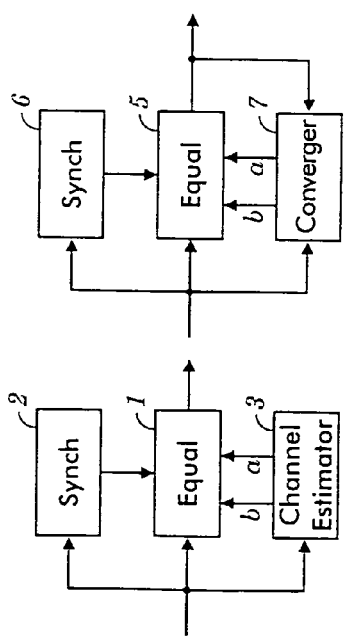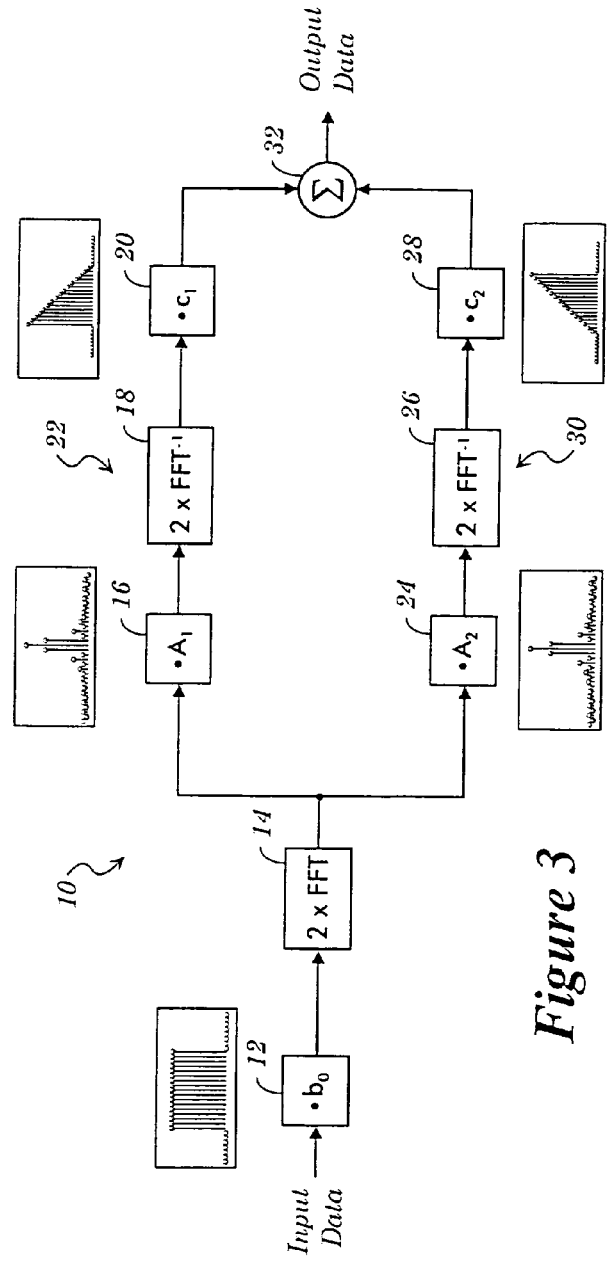

MULTIPATH GHOST ELIMINATING EQUALIZER WITH OPTIMUM NOISE ENHANCEMENT

TECHNICAL FIELD OF THE INVENTION

The present invention is directed to an equalizer that substantially eliminates signal ghosts of up to and including 100% ghosts and, more particularly, to a multipath equalizer with optimum noise enhancement.

BACKGROUND OF THE INVENTION

Ghosts are produced at a receiver usually because a signal arrives at the receiver through different transmission paths. For example, in a system having a single transmitter, the multipath transmission of a signal may occur because of signal reflection. That is, the receiver receives a transmitted signal and one or more reflections (i.e., ghosts) of the transmitted signal. As another example, the multipath transmission of a signal may occur in a system having plural transmitters that transmit the same signal to a receiver using the same carrier frequency. A network which supports this type of transmission is typically referred to as a single frequency network. Because a ghost results from the multipath transmission of a signal, a ghost is often referred to as multipath interference.

A variety of systems have been devised to deal with the problems caused by ghosts. For example, spread spectrum systems deal very adequately with the problem of a 100% ghost by spreading the transmitted data over a substantial bandwidth. Accordingly, even though a 100% ghost means that some information may be lost, the data can still be recovered because of the high probability that it was spread over frequencies that were not lost because of the ghost. Unfortunately, the data rate associated with spread spectrum systems is typically too low for many applications.

It is also known to transmit data as a data vector. A matched filter in a receiver correlates the received data with reference vectors corresponding to the possible data vectors that can be transmitted. A match indicates the transmitted data. Unfortunately, the data rate typically associated with the use of matched filters is still too low for many applications.

When high data rates are required, equalizers are often used in a receiver in order to reduce ghosts of a main signal. An example of a time domain equalizer is a FIR filter. A FIR filter convolves its response with a received signal in order to recover data and eliminate any ghosts of the data. The coefficients applied by the FIR filter asymptotically decrease toward zero for ghosts that are less than 100%. However, for 100% ghosts, the coefficients applied by the FIR filter do not asymptotically decrease toward zero so that a FIR filter becomes infinitely long if a 100% ghost is to be eliminated, making the FIR filter impractical to eliminate a 100% ghost.

A frequency domain equalizer typically includes a Fast Fourier Transform (FFT) which is applied to the received signal. A multiplier multiplies the frequency domain output of the FFT by a compensation vector. An inverse FFT is applied to the multiplication results in order to transform the multiplication results to the time domain. The compensation vector is arranged to cancel the ghost in the received signal leaving only the main signal. However, information in the received main signal is lost at certain frequencies so that the output of the inverse FFT becomes only an approximation of the transmitted data.

U.S. application Ser. No. 09/158,730 filed Sep. 22, 1998 discloses a vector domain equalizer which effectively eliminates ghosts up to 100% by distributing the transmitted data in both time and frequency so that the vectors are essentially random in the time and frequency domains. Accordingly, in a heavily ghosted channel, all data can be recovered with small noise enhancement, and any enhanced noise that does exist is near white. However, the number of calculations performed by the transform in the receiver to recover the data is large.

U.S. application Ser. No. 09/283,877 filed Apr. 1, 1999 discloses a single path equalizer which effectively eliminates ghosts up to 100% and which uses fewer calculations. This equalizer includes a preprocessor, a finite filter, and a post-processor. The pre-processor multiplies a data input block received from the channel by coefficients b in order to modulate the received main signal and its ghost so that the ghost is less than the received main signal. The finite filter applies coefficients a in order to eliminate the ghost from the multiplication results. The post-processor applies coefficients c to the output of the finite filter in order to reverse the effects of the modulation imposed by the pre-processor. Also, the post-processor applies a window function to the output of the finite filter. This single path equalizer somewhat enhances noise picked up in the channel.

U.S. application Ser. No. 09/425,522 filed Oct. 22, 1999 discloses a dual parallel path equalizer having a pre-processor, a finite filter, and a post-processor in each path. The pre-processors multiply a data input block received from the channel by corresponding coefficients $b_1$ and $b_2$ in order to modulate the received main signal and its ghost so that the ghost is less than the received main signal. The finite filters apply corresponding coefficients $a_1$ and $a_2$ in order to eliminate the ghost from the multiplication results. The post-processors apply corresponding coefficients $c_1$ and $c_2$ to the outputs of the finite filters in order to reverse the effects of the modulations imposed by the pre-processors. Each of the outputs of the post-processors is a solution to the problem of a ghost. That is, substantially no ghost is present in the output from each of the post-processors. The outputs of the post-processors are added in order to substantially minimize enhancement of noise, thus producing better signal to noise performance as compared to a single path equalizer.

The present invention is directed to an equalizer and to a controller for controlling the equalizer so that the equalizer has less hardware than past equalizers and so that the equalizer converges onto an output in which ghosts up to 100% are substantially eliminated.

SUMMARY OF THE INVENTION

In accordance with one aspect of the present invention, a method is provided to equalize a signal. The signal comprises a series of input blocks of coded data. The method comprises at least the following steps: a) shifting data in each input block of data left by one; b) complex multiplying each of the left shifted input block of data by a first set of equalizer coefficients to provide respective first adjusted output blocks of data, wherein step b) is not a full solution to ghosts; c) complex multiplying each of the input blocks of data by a second set of equalizer coefficients to provide respective second adjusted output blocks of data, wherein step c) is not a full solution to ghosts; d) shifting the data in each input block of data right by one; e) complex multiplying each of the right shifted input block of data by a third set of equalizer coefficients to provide respective third adjusted output blocks of data, wherein step e) is not a full solution to ghosts; f) adding corresponding ones of the first, second, and third adjusted output blocks of data; and, g) controlling the first, second, and third sets of equalizer coefficients so that, as a result of the addition performed according to step f), a substantially full solution to ghosts is obtained.

In accordance with a further aspect of the present invention, an equalizer for processing blocks of data comprises n−1 data shifters, n finite filters, an adder, and a controller. Each of the n−1 data shifters shifts the blocks of data. One of the n finite filters applies a corresponding set of finite filter coefficients to the blocks of data, and each of the other n−1 finite filters applies a set of finite filter coefficients to a corresponding output of the n−1 data shifters. Ghosts of the blocks of data are not eliminated as a result of the application of the sets of finite filter coefficients corresponding to the n finite filters, and n>2. The adder is arranged to add outputs from the n finite filters. The controller is arranged to control the sets of finite filter coefficients corresponding to the n finite filters so that the addition performed by the adder substantially eliminates the ghosts.

In accordance with another aspect of the present invention, an equalizer for processing blocks of data comprises first, second, third, and fourth data shifters, first, second, third, fourth, and fifth finite filters, an adder, and a controller. The first data shifter is arranged to shift the data left by two, and the second data shifter is arranged to shift the data left by one. The third data shifter is arranged to shift the data right by one, and the fourth data shifter is arranged to shift the data right by two. The first finite filter applies a first set of finite filter coefficients to each of the blocks of data which have been shifted by the first data shifter. Ghosts of the blocks of data are not eliminated as a result of the application of the first set of finite filter coefficients. The second finite filter applies a second set of finite filter coefficients to each of the blocks of data which have been shifted by the second data shifter. Ghosts of the blocks of data are not eliminated as a result of the application of the second set of finite filter coefficients. The third finite filter applies a third set of finite filter coefficients to each of the blocks of data. Ghosts of the blocks of data are not eliminated as a result of the application of the third set of finite filter coefficients. The fourth finite filter applies a fourth set of finite filter coefficients to each of the blocks of data which have been shifted by the third data shifter. Ghosts of the blocks of data are not eliminated as a result of the application of the fourth set of finite filter coefficients. The fifth finite filter applies a fifth set of finite filter coefficients to each of the blocks of data which have been shifted by the fourth data shifter. Ghosts of the blocks of data are not eliminated as a result of the application of the fifth set of finite filter coefficients. The adder is arranged to add outputs from the first, second, third, fourth, and fifth finite filters. The controller is arranged to control the first, second, third, fourth, and fifth sets of finite filter coefficients so that the addition performed by the adder substantially eliminates the ghosts.

BRIEF DESCRIPTION OF THE DRAWINGS

These and other features and advantages of the present invention will become more apparent from a detailed consideration of the invention when taken in conjunction with the drawings in which:

FIG. 1 illustrates a first embodiment of an equalizer synchronization and coefficient control according to the present invention;

FIG. 2 illustrates a second embodiment of an equalizer synchronization and coefficient control according to the present invention;

FIG. 3 illustrates a first embodiment of an equalizer in the form of a dual path equalizer according to the present invention;

DETAILED DESCRIPTION

System Diagrams

Figure 4:
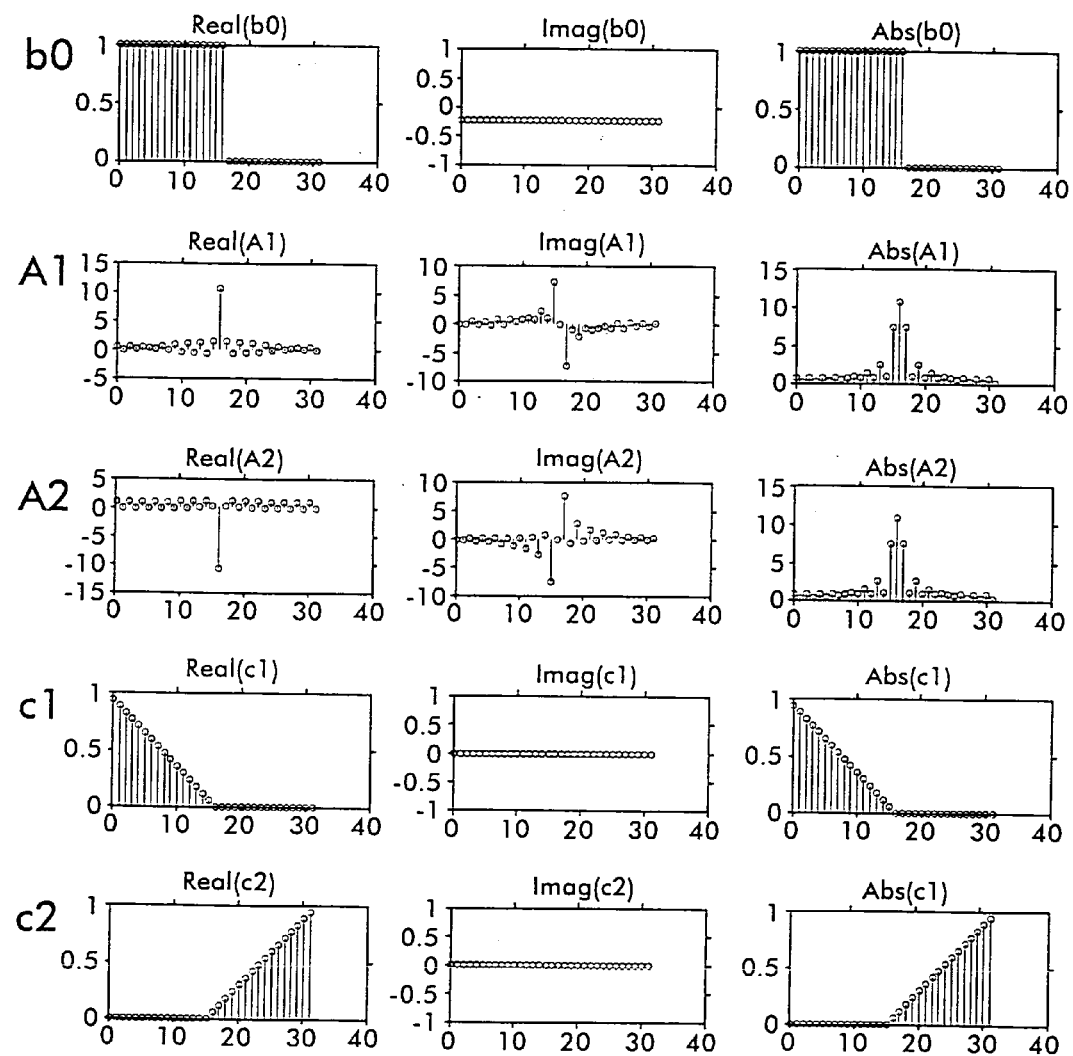
FIG. 4 illustrates an exemplary set of responses for corresponding elements of FIG. 3.

As discussed below, the equalizers of the present inventions apply b, a, and c coefficients to received data blocks in order to substantially eliminate ghosts of the data blocks that may be received by a receiver. The c coefficients are fixed in both magnitude and width and, thus, require only synchronization with the data blocks. The b coefficients are varied in width as the time interval between data blocks and ghosts vary. Thus, the b coefficients require both synchronization and width control. The a coefficients are varied in width, magnitude, and phase according to both the time interval between data blocks and ghosts and according to the characteristics of the ghosts. Accordingly, the a coefficients require synchronization, and width, magnitude, and phase control.

A first embodiment of a synchronization and coefficient control is shown in FIG. 1. As shown in FIG. 1, an equalizer 1, such as any of the equalizers described below, receives data and ghosts of the data. The data, for example, may be transmitted in the form of data blocks. The equalizer 1 processes the data blocks and ghosts in order to eliminate ghosts. A synchronizer 2 synchronizes the equalizer 1 to the incoming data blocks using any conventional synchronizing technique. A channel estimator 3 estimates the characteristics of the channel through which the data blocks are transmitted in order to control the b coefficients in width and to control the a coefficients in width, magnitude, and phase so as to substantially eliminate ghosts.

The channel estimator 3, for example, may be any of the channel estimators that are conventionally used in COFDM systems. Such channel estimators may be used to estimate the magnitude of ghosts, and the time interval between data blocks and their ghosts. The magnitude and time interval can be used as addresses into look up tables in order to read out the appropriate sets of a coefficients. In order to reduce the size of such look up tables to a manageable number of entries, interpolation may be used between entries when a combination of the time interval d and ghost magnitude does not correspond exactly to the addresses of the look up tables. The channel estimator 3 also uses the time interval d to control the width of the b coefficients as described below.

A second embodiment of a synchronization and coefficient control is shown in FIG. 2. As shown in FIG. 2, an equalizer 5, such as any of the equalizers described below, receives data and ghosts. The data, for example, may be in the form of data blocks. The equalizer 5 processes the data blocks and ghosts in order to eliminate the ghosts. A synchronizer 6 synchronizes the equalizer 5 to the incoming data blocks using any conventional synchronizing technique. A converger 7 compares the input and output of the equalizer 5 and adjusts the a coefficients based upon the comparison results in a direction to substantially eliminate ghosts. The converger 7 also determines the time interval d between data blocks and ghosts in order to control the width of the b coefficients. The converger 7 is described in more detail below.

Equalizers

A first equalizer embodiment, i.e., a dual path equalizer 10, is shown in FIG. 3 and includes a pre-processor 12 and a 2xFFT 14 (i.e., a twice-the-data-block-length FFT 14) in a common leg of the dual path equalizer 10. The dual path equalizer 10 also includes a first finite filter 16, a first 2xFFT$^{-1}$ 18, and a first post-processor 20 in a first path 22, and a second finite filter 24, a second 2xFFT$^{-1}$ 26, and a second post-processor 28 in a second path 30. The outputs of the first and second post-processors 20 and 28 are added by an adder 32.

The pre-processor 12 of the dual path equalizer 10 multiplies the signal received from the channel by coefficients $b_0$. The data may be transmitted in blocks with a guard interval between each adjacent pair of data blocks. The signal processed by the dual path equalizer 10, therefore, includes the data blocks and any ghosts of the data blocks. The coefficients $b_0$ are arranged as a window function that is substantially coextensive with a received data block and its ghost. Thus, the pre-processor 12 eliminates any energy, primarily noise, that is outside of the data blocks and their ghosts. The signal received from the channel is designated in FIG. 3 as Input Data.

The 2xFFT 14 applies a Fast Fourier Transform to the output of the pre-processor 12. The Fast Fourier Transform has sufficient coefficients so that it is longer than a data block and may be up to twice as long as a data block.

The first finite filter 16 applies coefficients $A_1$ to the output of the 2xFFT 14. The first finite filter 16 may be implemented as a complex multiplier that complex multiplies the coefficients $A_1$ by the frequency domain output of the 2xFFT 14. (Upper case letters are used to denote the frequency domain, and lower case letters are used to denote the time domain.) The output of the first finite filter 16 includes the data, a modified ghost of the data, and enhanced noise. Unlike the finite filters of the dual path equalizer disclosed in the aforementioned U.S. application Ser. No. 09/425,522, the first finite filter 16 does not eliminate the ghost from the frequency domain output of the pre-processor 12.

The first 2xFFT$^{-1}$ 18 applies an Inverse Fast Fourier Transform to the output of the first finite filter 16. The Inverse Fast Fourier Transform has sufficient coefficients so that it is longer than a data block and may be up to twice as long as a data block.

The first post-processor 20 multiplies the time domain output from the first 2xFFT$^{-1}$ 18 by coefficients $c_1$. The first post-processor 20 performs a window function to eliminate any energy, primarily noise, outside of the data blocks. This window function has a duration (i.e., width) which is substantially equal to the duration (i.e., width) of a data block. Also, the coefficients $c_1$ applied by the first post-processor 20 are chosen so as to substantially minimize noise enhancement. Unlike the output of the first post-processor of the dual path equalizer disclosed in the aforementioned U.S. application Ser. No. 09/425,522, the output of the first post-processor 20 does not, by itself, represent a solution to the problem of a ghost.

The second finite filter 24 applies coefficients $A_2$ to the output of the 2xFFT 14. The output of the second finite filter 24 includes the data of the data block, a modified ghost of the data block, and noise. As in the case of the first finite filter 16, the second finite filter 24 may be implemented as a complex multiplier and does not eliminate the ghost from the frequency domain output of the 2xFFT 14.

The second 2xFFT$^{-1}$ 26 applies an Inverse Fast Fourier Transform to the output of the second finite filter 24. The Inverse Fast Fourier Transform has sufficient coefficients so that it is longer than a data block and may be up to twice as long as a data block.

The second post-processor 28 multiplies the time domain output from the second 2xFFT$^{-1}$ 26 by coefficients $c_2$. The second post-processor 28 performs a window function to eliminate any energy in the received signal that is outside of the data blocks. This window function has a duration which is substantially equal to the duration of a data block. Also, the coefficients $c_2$ applied by the second post-processor 28 are chosen so as to substantially minimize noise enhancement. As in the case of the first post-processor 20, the output of the second post-processor 28 does not represent a solution to the problem of a ghost.

As discussed above, the outputs of the first and second post-processors 20 and 28 are added by the adder 32. As a result, the data blocks emerging from each of the first and second paths 22 and 30 are correlated and add to produce a larger amplitude. The ghosts in the outputs of the first and second post-processors 20 and 28 substantially cancel because of the application of the coefficients $A_1$, $A_2$, $c_1$, and $c_2$. Noise (such as white noise) is less correlated than the data blocks so that, when the outputs of the first and second post-processors 20 and 28 are added, the noise adds to a less extent than does the data blocks. Thus, noise enhancement is substantially minimized.

Thus, although neither of the outputs of the first and second post-processors 20 and 28 is a solution to channel distortion such as ghosts up to 100%, the combined output from the adder 32 is a solution, so that the dual path equalizer 10 adequately deals with ghosts up to and including a 100% ghost. Additionally, the signal to noise ratio of the dual path equalizer 10 is improved over a single path equalizer.

Exemplary sets of the coefficients $b_0$, $A_1$, $A_2$, $c_1$, and $c_2$ are shown in FIG. 4. The first column of FIG. 4 shows the real parts of the coefficients $b_0$, $A_1$, $A_2$, $c_1$, and $c_2$, the second column of FIG. 4 shows the imaginary parts of the coefficients $b_0$, $A_1$, $A_2$, $c_1$, and $c_2$, and the third column of FIG. 4 shows the absolute values of the coefficients $b_0$, $A_1$, $A_2$, $c_1$, and $c_2$.

As can be seen from FIG. 4, and as discussed above, the coefficients $b_0$ applied by the pre-processor 12 have a unity real part and a zero imaginary part that are arranged as a window function having a duration that is substantially coextensive with a received data block and its ghost. The number of coefficients in the set of coefficients $b_0$ depends upon the size of the data block and the interval d between the signal and its ghost. As shown in FIG. 4, for example, if there are sixteen samples in a data block and the interval d between the data block and its ghost is 1 sample (i.e., 1/16 of a data block), then there are seventeen coefficients (16+1) in the set of coefficients $b_0$. The width of (i.e., the number of coefficients in) the set of coefficients $b_0$, therefore, is varied as the interval d between the data block and its ghost varies.

The coefficients $c_1$ and $c_2$ applied respectively by the first and second post-processors 20 and 28 have oppositely sloped real parts and zero imaginary parts that are arranged as corresponding window functions. The coefficients $c_1$ and $c_2$ are sloped, linear, and reversed weighting functions that operate to optimize noise in such a way that the signal to noise ratio at the output of the adder 32 is substantially enhanced. The width of the coefficients $c_1$ is fixed and is equal to the width of a data block. Thus, if a data block has sixteen samples, then there are sixteen coefficients $c_1$. Similarly, the width of the coefficients $c_2$ is fixed and is equal to the width of a data block. Thus, if a data block has sixteen samples, then there are sixteen coefficients $c_2$.

The coefficients $A_1$ and $A_2$ applied respectively by the first and second finite filters 16 and 24 have non-zero real and imaginary parts. As discussed below, the coefficients $A_1$ and $A_2$ are adjusted during operation of the dual path equalizer 10 so that, when the outputs of the first and second paths 22 and 30 are added by the adder 32, ghosts are substantially eliminated and noise enhancement is substantially minimized. Each of the coefficients $A_1$ and $A_2$ has a width that is up to twice as long as the width of a data block. Thus, if the data block has sixteen samples, for example, there may be up to thirty-two coefficients for each of the coefficients $A_1$ and $A_2$.

The pre-processor 12 eliminates noise that may exist outside of the data block and its ghost. Thus, the pre-processor 12 could be eliminated from the dual path equalizer 10. However, if so, noise in the output of the dual path equalizer 10 will be greater than if the pre-processor 12 were not eliminated.

The dual path equalizer 10 includes only one pre-processor and only one FFT. Accordingly, there is less hardware in the dual path equalizer 10 than in the dual path equalizer disclosed in the aforementioned application Ser. No. 09/425,522.

Figure 5:
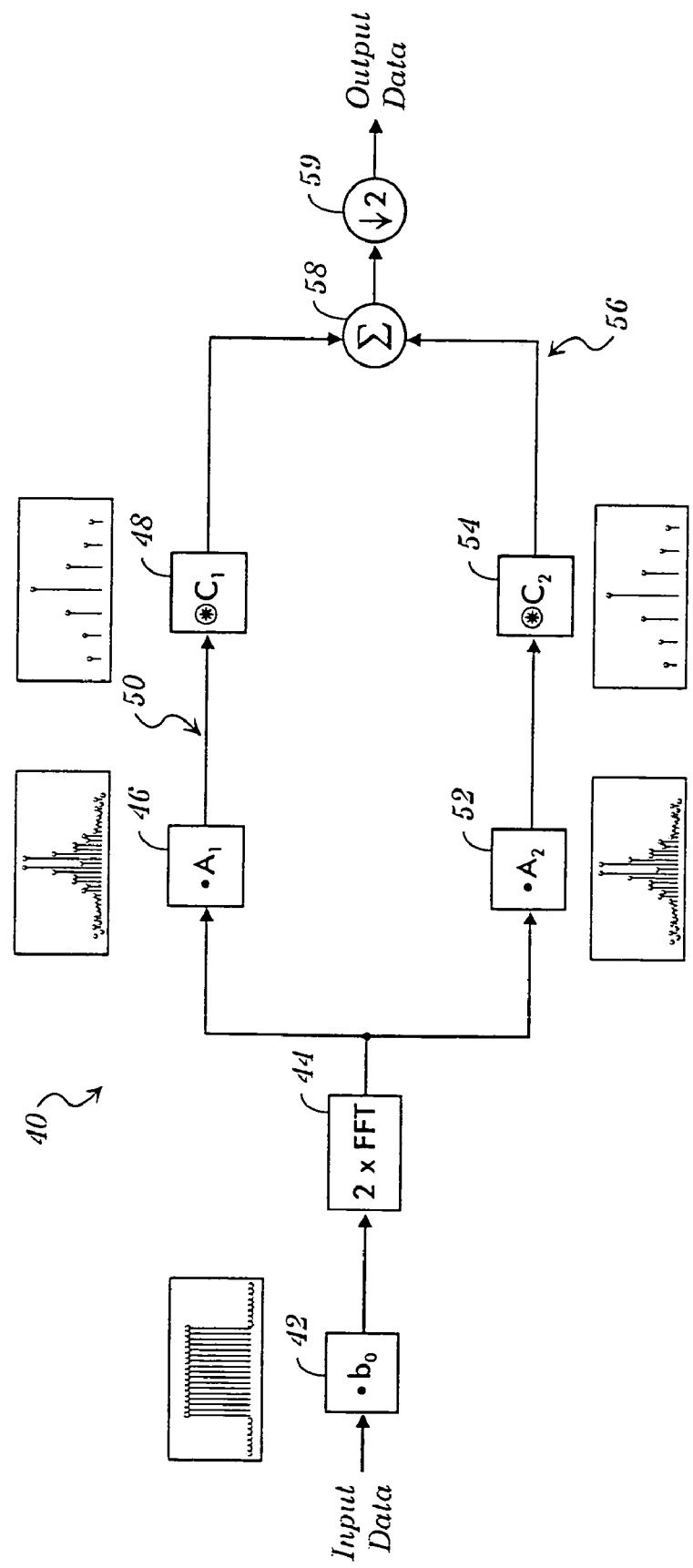
FIG. 5 illustrates a second embodiment of an equalizer in the form a dual path equalizer according to the present invention.

As a second equalizer embodiment, a dual path equalizer 40 is shown in FIG. 5 and includes a pre-processor 42 and a 2xFFT 44 in a common leg. The dual path equalizer 40 also includes a first finite filter 46 and a first post-processor 48 in a first path 50, and a second finite filter 52 and a second post-processor 54 in a second path 56. The outputs of the first and second post-processors 48 and 54 are added by an adder 58, and the output of the adder 58 is down sampled by two by a down sampler 59. Down sampling is needed to reduce the over sampling data produced by the 2xFFT 44 in a manner equivalent to that effected by the window functions applied by the first and second post-processors 20 and 28 of FIG. 3.

The pre-processor 42 of the dual path equalizer 40 multiplies the signal received from the channel by coefficients $b_0$. As in the case of the coefficients $b_0$ applied by the pre-processor 12, the coefficients $b_0$ applied by the pre-processor 42 are arranged as a window function that is substantially coextensive with a received data block and its ghost.

The 2xFFT 44 applies a Fast Fourier Transform to the output of the pre-processor 42. The Fast Fourier Transform has sufficient coefficients so that it is longer than a data block and may be up to twice as long as a data block.

The first finite filter 46 applies coefficients $A_1$ to the output of the 2xFFT 44. The first finite filter 46 may be implemented as a complex multiplier that complex multiplies the coefficients $A_1$ by the frequency domain output of the 2xFFT 44. As in the case of the first and second finite filters 16 and 24 of FIG. 3, the first finite filter 46 does not eliminate ghosts from the frequency domain output of the 2xFFT 44.

The first post-processor 48 convolves the frequency domain output from the first finite filter 46 with coefficients $C_1$. As in the case of the first and second post-processors 20 and 28 of FIG. 3, the output of the first post-processor 48 does not represent a solution to the problem of a ghost. However, the first post-processor 48 weights the output of the first finite filter 46 in order to substantially optimize noise in the first path 50. Accordingly, when the output of the first post-processor 48 is combined with the output of the second post-processor 54 by the adder 58, ghosts are substantially eliminated in the output of the adder 58, and noise enhancement is substantially minimized.

The second finite filter 52 applies coefficients $A_2$ to the output of the 2xFFT 44. The second finite filter 52 may be implemented as a complex multiplier that complex multiplies the coefficients $A_2$ by the frequency domain output of the 2xFFT 44. As in the case of the first finite filter 46, the second finite filter 52 does not eliminate ghosts from the frequency domain output of the pre-processor 42.

The second post-processor 54 convolves the frequency domain output from the second finite filter 52 with coefficients $C_2$. As in the case of the first post-processor 48, the output of the second post-processor 54 does not represent a solution to the problem of a ghost. However, the second post-processor 54 weights the output of the second finite filter 52 in order to substantially optimize the noise picked up from the channel by the received signal. Accordingly, as discussed above, when the output of the first post-processor 48 is combined with the output of the second post-processor 54 by the adder 58, ghosts are substantially eliminated in the output of the adder 58, and noise enhancement is substantially minimized.

As indicated above, the outputs of the first and second post-processors 48 and 54 are added by the adder 58. As a result, the data blocks emerging from each of the first and second paths 50 and 56 are correlated and add to produce a larger amplitude. The ghosts in the outputs of the first and second post-processors 48 and 54 substantially cancel because of the application of the coefficients $A_1$, $A_2$, $c_1$, and $c_2$. Noise (such as white noise) is less correlated than the data blocks so that, when the outputs of the first and second post-processors 48 and 54 are added, the noise adds to a less extent than does the data blocks. Thus, noise enhancement is substantially minimized.

Accordingly, although neither of the outputs of the first and second post-processors 48 and 54 is a solution to channel distortion such as ghosts up to the 100%, the combined output from the adder 58 is a solution, so that the dual path equalizer 40 adequately deals with ghosts up to and including a 100% ghost. Additionally, the signal to noise ratio of the dual path equalizer 40 is improved over a single path equalizer.

The dual path equalizer 40 does not include the first $2xFFT^{-1}$ 18 and the second $2xFFT^{-1}$ 26 of the dual path equalizer 10. Accordingly, there is less hardware in the dual path equalizer 40 than in the dual path equalizer 10. Also, because there is a Fast Fourier Transform but no Inverse Fast Fourier Transform upstream of the first and second post-processors 48 and 54, the first and second post-processors 48 and 54 are arranged to operate in the frequency domain. Because the dual path equalizer 40 has an FFT but no inverse FFTs, an inverse FFT should be included in the transmitter that transmits the data blocks to the dual path equalizer 40.

Figure 6:
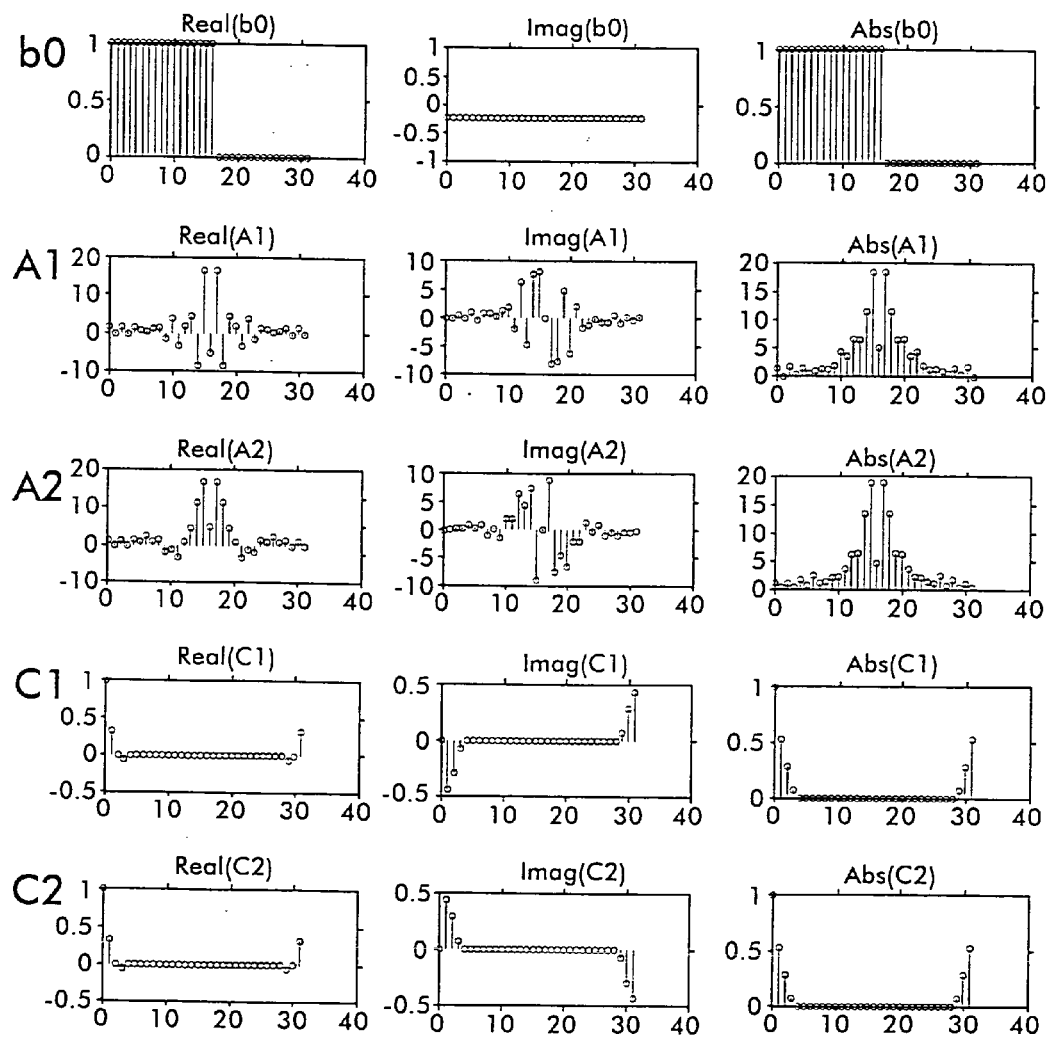
FIG. 6 illustrates an exemplary set of responses for corresponding elements of FIG. 5.

Exemplary sets of the coefficients $b_0$, $A_1$, $A_2$, $C_1$, and $C_2$ are shown in FIG. 6 for an interval or delay of $\frac{1}{16}$ between a data block and its ghost. The first column of FIG. 6 shows the real parts of the coefficients $b_0$, $A_1$, $A_2$, $C_1$, and $C_2$, the second column of FIG. 6 shows the imaginary parts of the coefficients $b_0$, $A_1$, $A_2$, $C_1$, and $C_2$, and the third column of FIG. 6 shows the absolute values of the coefficients $b_0$, $A_1$, $A_2$, $C_1$, and $C_2$. The coefficients $b_0$ applied by the pre-processor 42 may be the same as the coefficients $b_0$ applied by the pre-processor 12. As can be seen from FIG. 6, and as discussed above, the coefficients $b_0$ applied by the pre-processor 42 have a unity real part and a zero imaginary part that are arranged as a window function having a duration that is substantially coextensive with a received data block and its ghost.

The coefficients $A_1$ and $A_2$ applied respectively by the first and second finite filters 46 and 52 have non-zero real and imaginary parts. As discussed below, the coefficients $A_1$ and $A_2$ are adjusted during operation of the dual path equalizer 40 so that, when the outputs of the first and second paths 50 and 56 are added by the adder 58, ghosts are substantially eliminated and noise enhancement is substantially minimized.

The coefficients $C_1$ applied by the first post-processor 48 may be derived by performing a Fast Fourier Transform of the coefficients $c_1$ applied by the first post-processor 20 of the dual path equalizer 10. A predetermined number of the resulting coefficients may then be used as the coefficients $C_1$. For example, as shown in FIG. 6, the resulting seven most significant coefficients are used as the coefficients $C_1$. However, more of the coefficients resulting from the Fast Fourier Transform of the coefficients $c_1$ applied by the first post-processor 20 could be used in order to more effectively eliminate ghosts and minimize noise enhancement.

Similarly, the coefficients $C_2$ applied by the second post-processor 56 may be derived by performing a Fast Fourier Transform of the coefficients $c_2$ applied by the second post-processor 28 of the dual path equalizer 10. A predetermined number of the resulting coefficients may then be used as the coefficients $C_2$. For example, as shown in FIG. 6, the resulting seven most significant coefficients are used as the coefficients $C_2$. However, more of the coefficients resulting from the Fast Fourier Transform of the coefficients $c_2$ applied by the second post-processor 28 could be used if desired.

Figure 7:
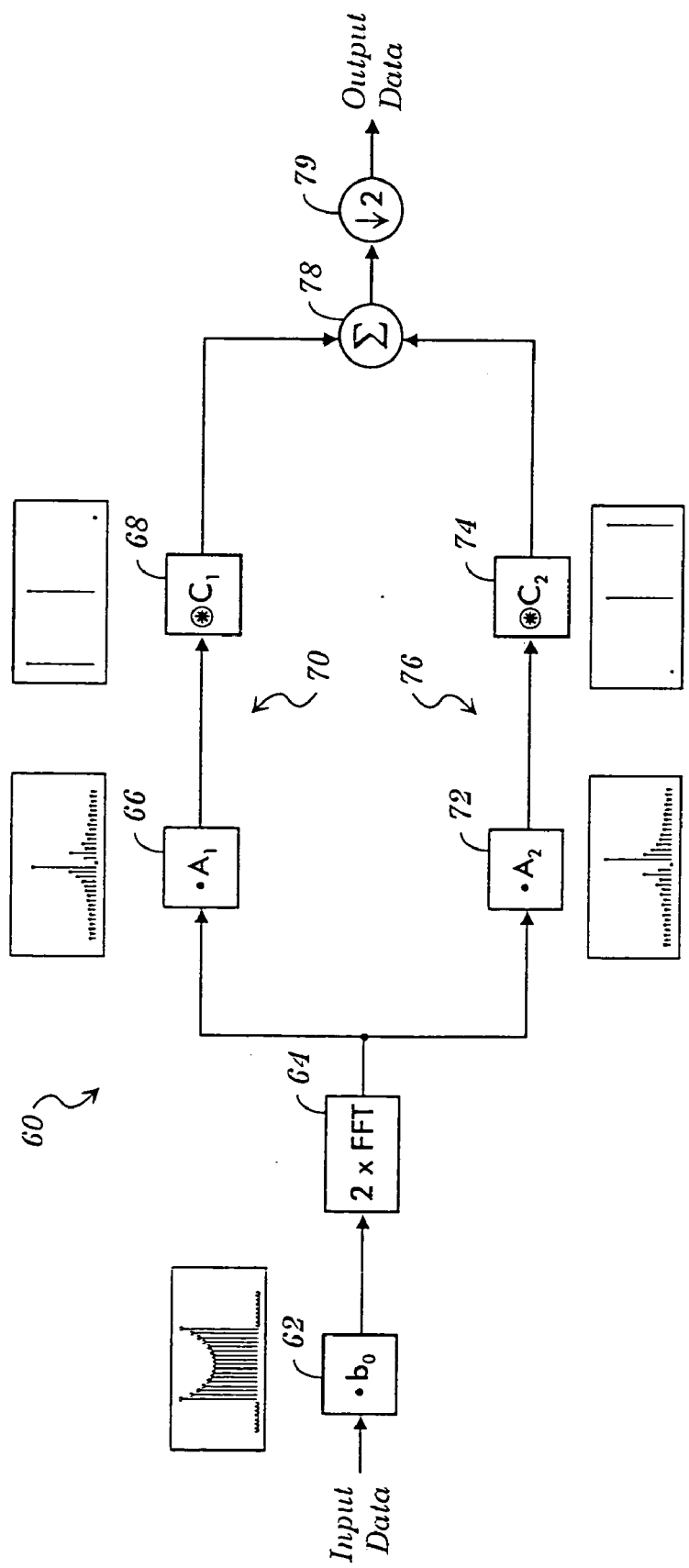
FIG. 7 illustrates a third embodiment of an equalizer in the form a dual path equalizer according to the present invention.

As a third equalizer embodiment, a dual path equalizer 60 is shown in FIG. 7 and includes a pre-processor 62 and a 2xFFT 64 in a common leg. The dual path equalizer 60 also includes a first finite filter 66 and a first post-processor 68 in a first path 70, and a second finite filter 72 and a second post-processor 74 in a second path 76. The outputs of the first and second post-processors 68 and 74 are added by an adder 78, and the output of the adder 78 is down sampled by two by a down sampler 79.

As can be seen by comparing FIGS. 5 and 7, the hardware of the dual path equalizer 60 is quite similar to the hardware of the dual path equalizer 40. However, the coefficients applied by the pre-processor 62, by the first and second finite filters 66 and 72, and by the first and second post-processors 68 and 74 are different.

The coefficients $b_0$ applied by the pre-processor 62 are curved as can be seen in FIG. 7. The coefficients $b_0$ are curved according to the function $1/(2-\cos(t))$. The coefficients $b_0$ applied by the pre-processor 62 are curved in order to minimize the complexity of the coefficients $C_1$ and $C_2$ applied by the first and second post-processors 48 and 54 of the dual path equalizer 40 shown in FIG. 5. This curvature of the coefficients $b_0$ permits implementation of the first and second post-processors 68 and 74 as simplified two tap convolvers. Each tap of each convolver has a magnitude of one which permits the first and second post-processors 68 and 74 to be implemented as adders rather than as multipliers. As in the case of the prior embodiments, the width of (i.e., the number of coefficients in) the set of coefficients $b_0$ is varied as the interval d between the data block and its ghost varies. As the width of the set of coefficients $b_0$ varies, the curvature of the coefficients $b_0$ still follows the function $1/(2-\cos(t))$.

The coefficients $A_1$ and $A_2$ applied respectively by the first and second finite filters 66 and 72 have non-zero real and imaginary parts. As discussed below, the coefficients $A_1$ and $A_2$ are adjusted during operation of the dual path equalizer 60 so that, when the outputs of the first and second paths 70 and 76 are added by the adder 78, ghosts are substantially eliminated and noise enhancement is substantially minimized.

The coefficients $C_1$ applied by the first post-processor 68 are such that application of an Inverse Fast Fourier Transform to the coefficients $C_1$ results in a set of coefficients in the time domain that have a curvature corresponding to the curvature of the coefficients $b_0$. Similarly, the coefficients $C_2$ applied by the second post-processor 74 are such that application of an Inverse Fast Fourier Transform to the coefficients $C_2$ results in a set of coefficients in the time domain that have a curvature corresponding to the curvature of the coefficients $b_0$.

Figure 8:
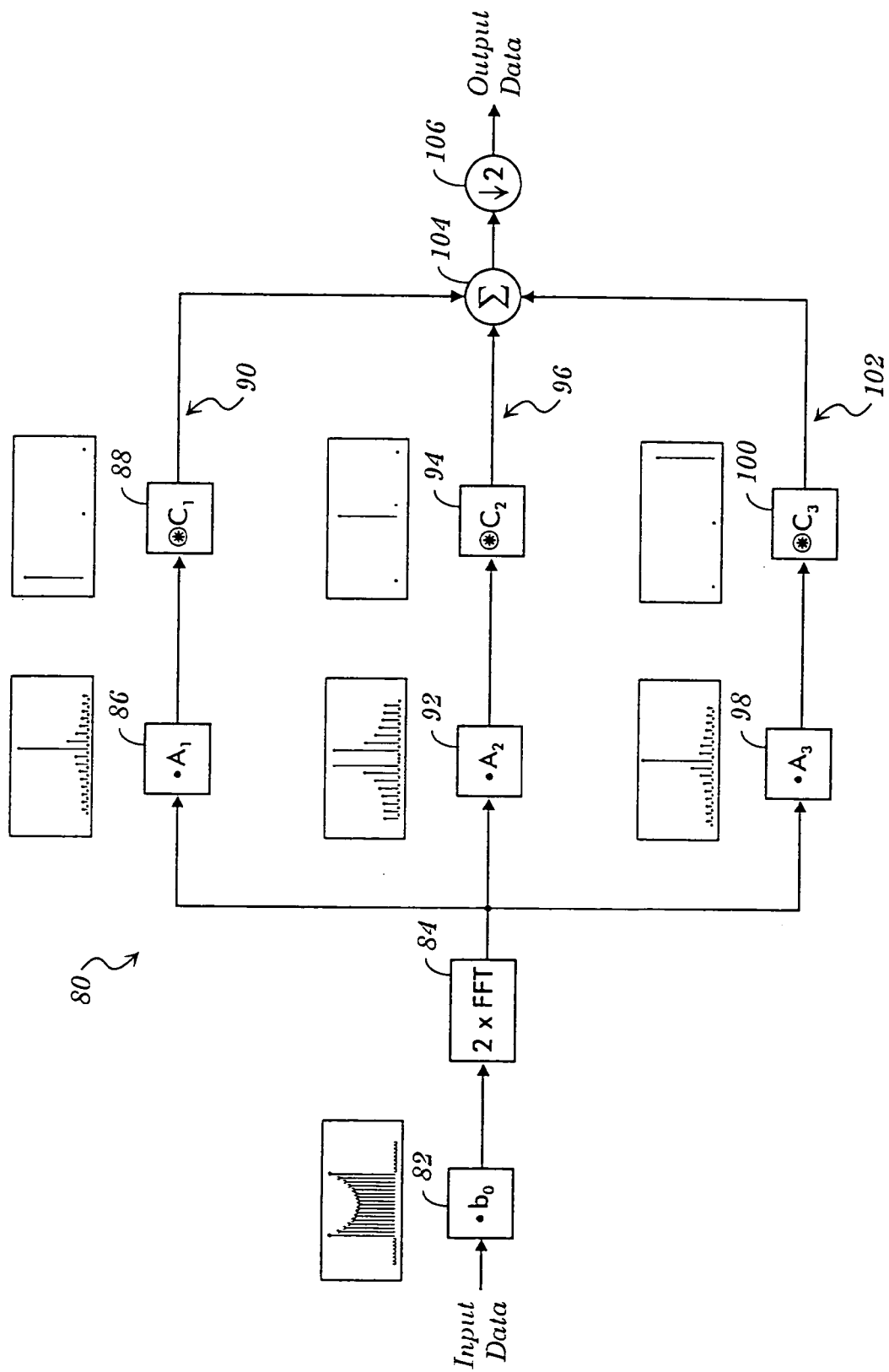
FIG. 8 illustrates a fourth embodiment of an equalizer in the form a triple path equalizer according to the present invention.

It may be noted that the right most tap of the coefficients $C_1$ and the left most tap of the coefficients $C_2$ coincide. Accordingly, the coefficients $C_1$ and $C_2$ may be de-composed into three sets of coefficients and may be applied by three corresponding post-processors as shown in FIG. 8. FIG. 8 shows a fourth equalizer embodiment in the form of a triple path equalizer 80 which includes a pre-processor 82 and a 2xFFT 84 in a common leg. The triple path equalizer 80 also includes a first finite filter 86 and a first post-processor 88 in a first path 90, a second finite filter 92 and a second post-processor 94 in a second path 96, and a third finite filter 98 and a third post-processor 100 in a third path 102. The outputs of the first, second, and third post-processors 88, 94, and 100 are added by an adder 104. A down sampler 106 down samples by two the output of the adder 104.

The coefficients $b_0$ applied by the pre-processor 82 are the same as the coefficients $b_0$ applied by the pre-processor 62 of the dual path equalizer 60. The coefficients $A_1$ applied by the first finite filter 86, the coefficients $A_2$ applied by the second finite filter 92, and the coefficients $A_3$ applied by the third finite filter 98 are adjusted during operation of the triple path equalizer 80 so that, when the outputs of the first, second, and third paths 90, 96, and 102 are added by the adder 104, ghosts are substantially eliminated and noise enhancement is substantially minimized. The coefficient $C_1$ applied by the first post-processor 88 is the left-hand value of the coefficients $C_1$ applied by the first post-processor 68, the coefficient $C_2$ applied by the second post-processor 94 is the common value of the coefficients $C_1$ and $C_2$ applied by the first and second post-processors 68 and 74, and the coefficient $C_3$ applied by the third post-processor 100 is the right-hand value of the coefficients $C_2$ applied by the second post-processor 74.

The single tap of the first post-processor 88 results in a shift of one sample to the left of the data processed in the first path 90, the single tap of the second post-processor 94 results in no sample shift of the data processed in the second path 96, and the single tap of the third post-processor 100 results in a shift of one sample to the right of the data processed in the third path 102. Therefore, as shown by a triple path equalizer 110 of FIG. 9, the first, second, and third post-processors 88, 94, and 100 can be replaced by sample shifters.

Accordingly, the triple path equalizer 110 includes a pre-processor 112 and a 2xFFT 114 in a common leg. The triple path equalizer 110 also includes a left one-sample shifter 116, a first by-two down sampler 118, and a first finite filter 120 in a first path 122, a second by-two down sampler 124 and a second finite filter 126 in a second path 128, and a right one-sample shifter 130, a third by-two down sampler 132, and a third finite filter 134 in a third path 136. The outputs of the first, second, and third finite filters 120, 126, and 134 are added by an adder 138.

The coefficients $b_0$ applied by the pre-processor 112 are the same as the coefficients $b_0$ applied by the pre-processor 82 of the triple path equalizer 80. The coefficients $A_1$ applied by the first finite filter 120, the coefficients $A_2$ applied by the second finite filter 126, and the coefficients $A_3$ applied by the third finite filter 134 are adjusted during operation of the triple path equalizer 110 so that, when the outputs of the first, second, and third paths 122, 128, and 136 are added by the adder 138, ghosts are substantially eliminated and noise enhancement is substantially minimized.

Figure 9:
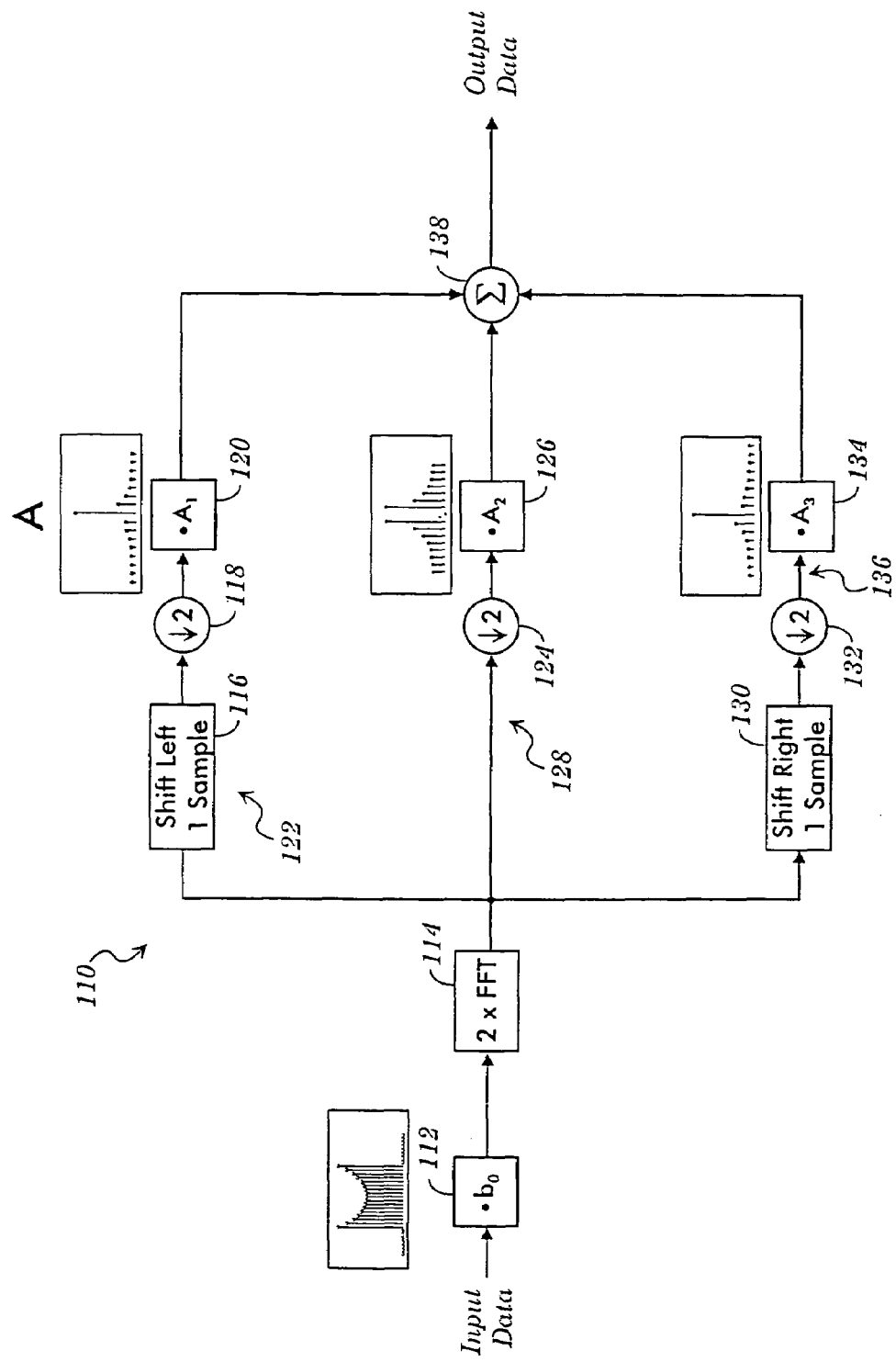
FIG. 9 illustrates a fifth embodiment of an equalizer in the form a triple path equalizer according to the present invention.
Figure 10:
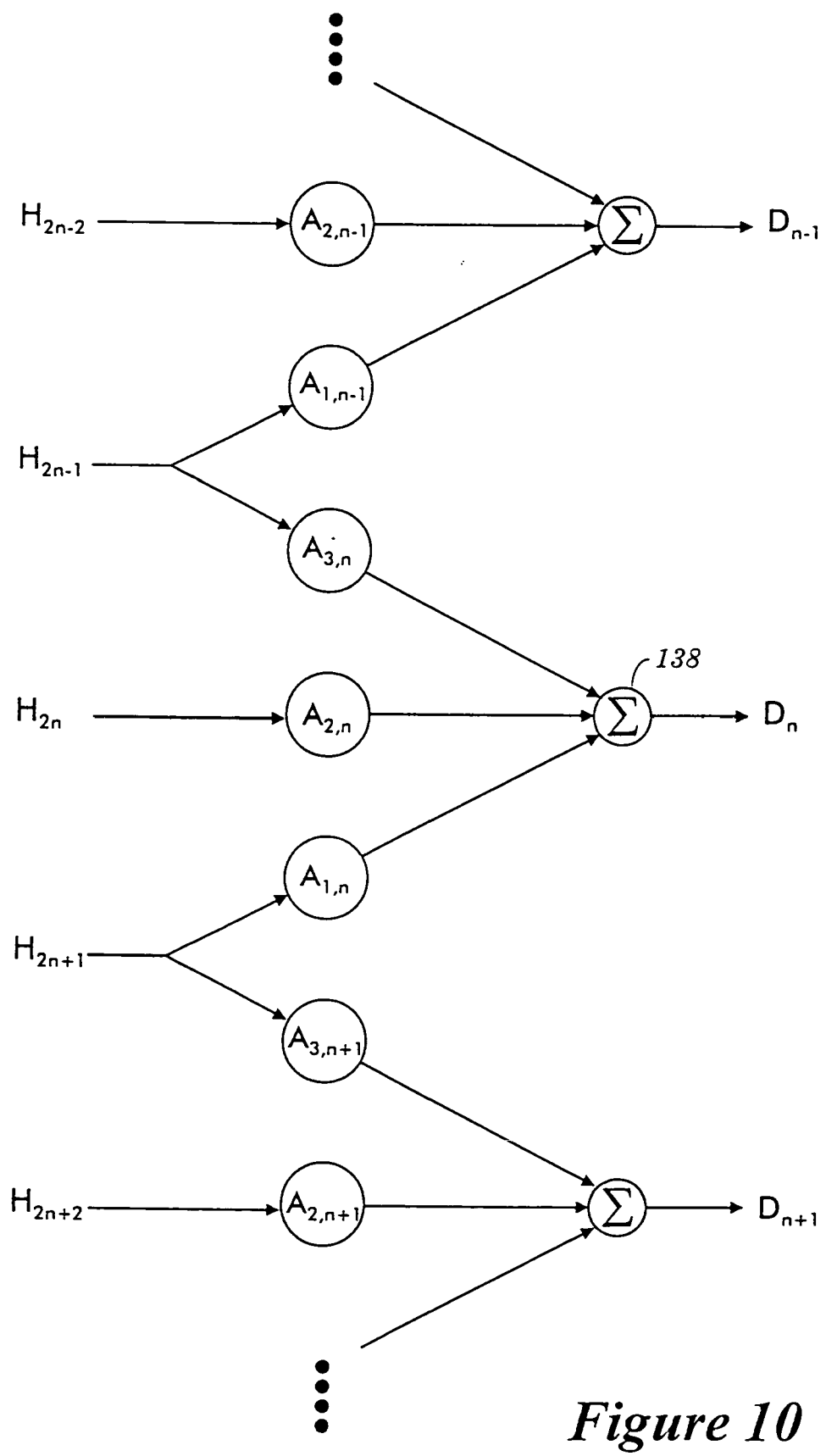
FIG. 10 illustrates a flow graph for the triple path equalizer shown in FIG. 9.

FIG. 10 illustrates a flow graph for the triple path equalizer 110 shown in FIG. 9. The variable n designates the number of the sample emerging from the 2xFFT 114. To produce an output sample $D_n$ from the adder 138, the first finite filter 120 processes a sample $H_{2n-1}$, the second finite filter 126 processes a sample $H_{2n}$, and the third finite filter 134 processes a sample $H_{2n+1}$. Because of the second by-two down sampler 124, the second finite filter 126 processes only the even samples of the samples supplied by the 2xFFT 114. Because of the left one-sample shifter 116 and the first by-two down sampler 118, the first finite filter 120 processes the sample $H_{2n-1}$ which is one odd sample behind the sample $H_{2n}$. Because of the right one-sample shifter 130 and the third by-two down sampler 132, the third finite filter 134 processes the sample $H_{2n+1}$ which is one odd sample ahead of the sample $H_{2n}$.

Figure 11:
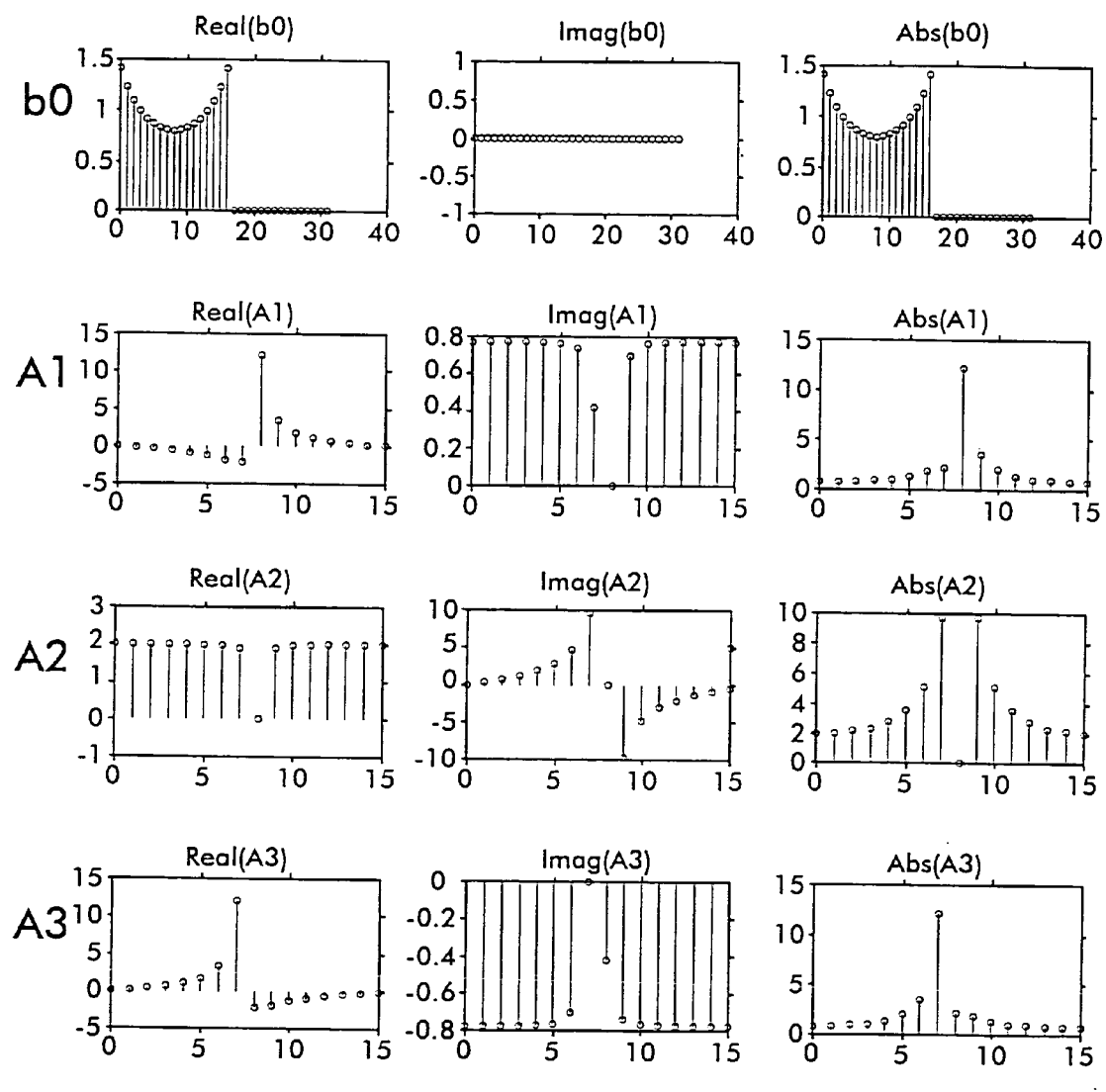
FIG. 11 illustrates an exemplary set of responses for corresponding elements of FIG. 9.

Exemplary sets of the coefficients $b_0$, $A_1$, $A_2$, and $A_3$, are shown in FIG. 11 assuming an interval d between a data block and its ghost of one sample (i.e., 1/16 of a data block containing sixteen samples). The first column of FIG. 11 shows the real parts of the coefficients $b_0$, $A_1$, $A_2$, and $A_3$, the second column of FIG. 11 shows the imaginary parts of the coefficients $b_0$, $A_1$, $A_2$, and $A_3$, and the third column of FIG. 11 shows the absolute values of the coefficients $b_0$, $A_1$, $A_2$, and $A_3$.

The coefficients $b_0$ applied by the pre-processor 112 are the same as the coefficients $b_0$ applied by the pre-processor 62. As in the case of the triple path equalizer 80, the width of (i.e., the number of coefficients in) the set of coefficients $b_0$ is varied as the interval d between the data block and its ghost varies. As the width of the set of coefficients $b_0$ varies, the curvature of the coefficients $b_0$ still follows the function $1/(2-\cos(t))$.

As can be seen from FIG. 11, and as discussed above, the coefficients $b_0$ applied by the preprocessor 112 have a real part shaped according to the function $1/(2-\cos(t))$ and a zero imaginary part and are arranged as a window function having a duration that is substantially coextensive with a received data block and its ghost. The coefficients $A_1$ applied by the first finite filter 120, the coefficients $A_2$ applied by the second finite filter 126, and the coefficients $A_3$ applied by the third finite filter 134 are adjusted during operation of the triple path equalizer 110 so that, when the outputs of the first, second, and third paths 122, 128, and 136 are added by the adder 138, ghosts are substantially eliminated and noise enhancement is substantially minimized.

Figure 12:
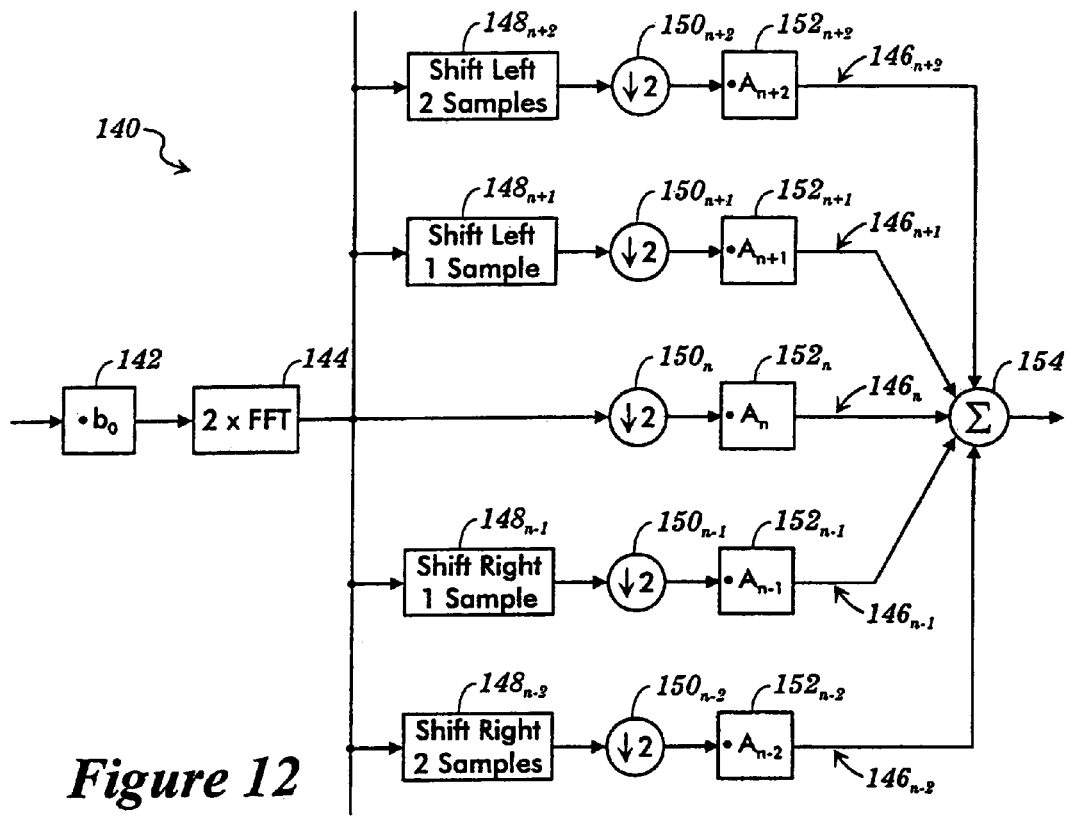
FIG. 12 illustrates a sixth embodiment of an equalizer in the form a generalized multipath equalizer according to the present invention.

The triple path equalizer 110 shown in FIG. 9 can be generalized by expanding the number of paths. Accordingly, a multipath equalizer 140 shown in FIG. 12 includes a pre-processor 142 and a 2xFFT 144 in a common leg. The multipath equalizer 140 also includes a plurality of paths . . . $146_{n-2}$, $146_{n-1}$, $146_n$, $146_{n+1}$, $146_{n+2}$ . . . having corresponding sample shifters . . . $148_{n-2}$, $148_{n-1}$, $148_{n+1}$, $148$ . . . , corresponding by-two down samplers . . . $150_{n-2}$, $150_{n-1}$, $150_n$, $150_{n+1}$, $150_{n+2}$ . . . , and corresponding finite filters . . . $152_{n-2}$, $152_{n-1}$, $152_n$, $152_{n+1}$, $152_{n+2}$ . . . . The outputs of the finite filters . . . $152_{n-2}$, $152_{n-1}$, $152_n$, $152_{n+1}$, $152_{n+2}$ . . . are added by an adder 154.

The coefficients $b_0$ applied by the pre-processor 142 are the same as the coefficients $b_0$ applied by the pre-processor 82 of the triple path equalizer 80. As in the case of the triple path equalizer 80, the width of (i.e., the number of coefficients in) the set of coefficients $b_0$ is varied as the interval d between the data block and its ghost varies. As noted above, the window function applied by the pre-processor 142 eliminates any energy, primarily noise, that is outside of the data blocks and their ghosts. The pre-processor 142 can be eliminated. However, if the pre-processor 142 is eliminated, the finite filters . . . $152_{n-2}$, $152_{n-1}$, $152_n$, $152_{n+1}$, $152_{n+2}$ . . . will process more noise than would otherwise be the case. Thus, without the pre-processor 142, additional noise may be present in the output of the adder 154.

The coefficients . . . $A_{n-2}$, $A_{n-1}$, $A_n$, $A_{n+1}$, $A_{n+2}$ . . . applied by the corresponding finite filters . . . $152_{n-2}$, $152_{n-1}$, $152_n$, $152_{n+1}$, $152_{n+2}$ . . . are adjusted during operation of the multipath equalizer 140 so that, when the outputs of the paths . . . $146_{n-2}$, $146_{n-1}$, $146_n$, $146_{n+1}$, $146_{n+2}$ . . . are added by the adder 154, ghosts are substantially eliminated and noise enhancement is substantially minimized.

Figure 13:
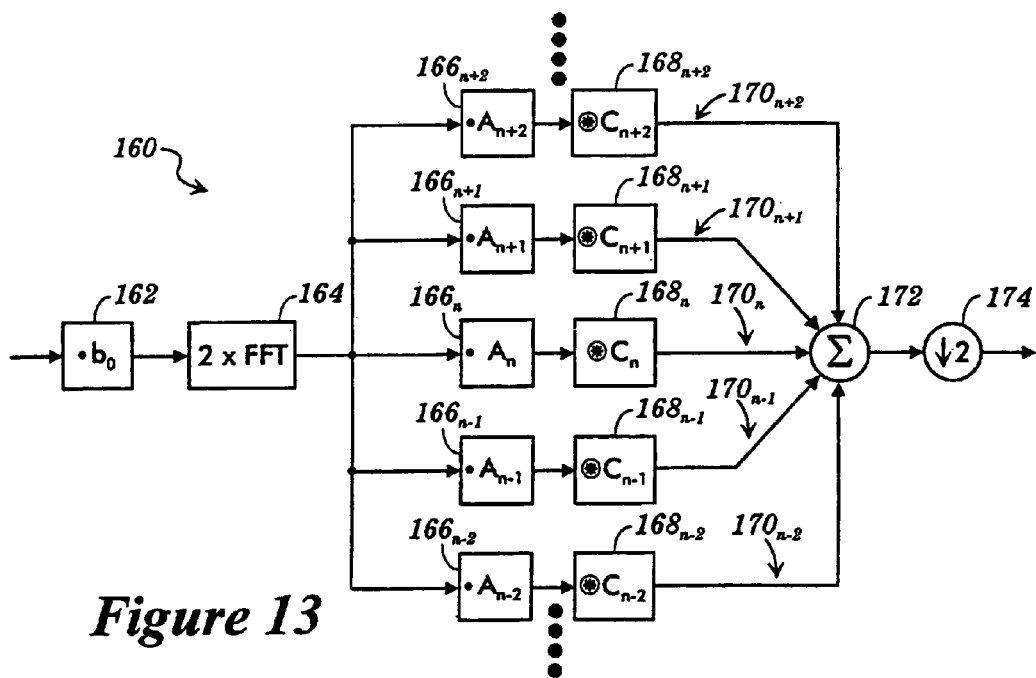
FIG. 13 illustrates a seventh embodiment of an equalizer in the form a generalized multipath equalizer according to the present invention.

Similarly, the dual path equalizer 40 as shown in FIG. 5 can be generalized by expanding the number of paths. Accordingly, a multipath equalizer 160 shown in FIG. 13 includes a pre-processor 162 and a 2xFFT 164 in a common leg. The multipath equalizer 160 also includes finite filters . . . $166_{n-2}$, $166_{n-1}$, $166_n$, $166_{n+1}$, $166_{n+2}$ . . . and corresponding post-processors . . . $168_{n-2}$, $168_{n-1}$, $168_n$, $168_{n+1}$, $168_{n+2}$ . . . arranged in corresponding paths . . . $170_{n-2}$, $170_{n-1}$, $170_n$, $170_{n+1}$, $170_{n+2}$ . . . . The outputs of the post-processors . . . $168_{n-2}$, $168_{n-1}$, $168_n$, $168_{n+1}$, $168_{n+2}$ . . . are added by an adder 172, and the output of the adder 172 is down sampled by two by a down sampler 174.

The finite filters . . . $166_{n-2}$, $166_{n-1}$, $166_n$, $166_{n+1}$, $166_{n+2}$ . . . may be implemented as complex multipliers that complex multiply the coefficients . . . $A_{n-2}$, $A_{n-1}$, $A_n$, $A_{n+1}$, $A_{n+2}$ . . . by the frequency domain output of the 2xFFT 164. The post-processors . . . $168_{n-2}$, $168_{n-1}$, $168_n$, $168_{n+1}$, $168_{n+2}$ . . . convolve the frequency domain outputs from the finite filters . . . $166_{n-2}$, $166_{n-1}$, $166_n$, $166_{n+1}$, $166_{n+2}$ . . . with coefficients . . . $C_{n-2}$, $C_{n-1}$, $C_n$, $C_{n+1}$, $C_{n+2}$ . . . .

The coefficients . . . $A_{n-2}$, $A_{n-1}$, $A_n$, $A_{n+1}$, $A_{n+2}$ . . . applied by the corresponding finite filters . . . $166_{n-2}$, $166_{n-1}$, $166_n$, $166_{n+1}$, $166_{n+2}$ . . . are adjusted during operation of the multipath equalizer 160 so that, when the outputs of the paths . . . $170_{n-2}$, $170_{n-1}$, $170_n$, $170_{n+1}$, $170_{n+2}$ . . . are added by the adder 172, ghosts are substantially eliminated and noise enhancement is substantially minimized.

The coefficients . . . $C_{n-2}$, $C_{n-1}$, $C_n$, $C_{n+1}$, $C_{n+2}$ . . . may include the coefficients $C_1$ and $C_2$ applied by the first and second post-processors 48 and 54 of the dual path equalizer 40 and additional coefficients selected to achieve a desired level of performance. Also, the pre-processor 162 can be eliminated. However, if the pre-processor 162 is eliminated, the finite filters . . . $166_{n-2}$, $166_{n-1}$, $166_n$, $166_{n+1}$, $166_{n+2}$ . . . will process more noise than would otherwise be the case. Thus, without the pre-processor 162, additional noise may be present in the output of the adder 172.

One of the advantages of the multipath equalizers 140 and 160 is that, by increasing the number of finite filters, any weighting functions characterizing the pre-processors 142 and 162 can be transferred to the finite filters. Accordingly, the pre-processors 142 and 162 can be eliminated. Alternatively, the weighting of the coefficients of the pre-processors 142 and 162 can be eliminated so that these coefficients form pure window functions.

Convergence

Figure 14:
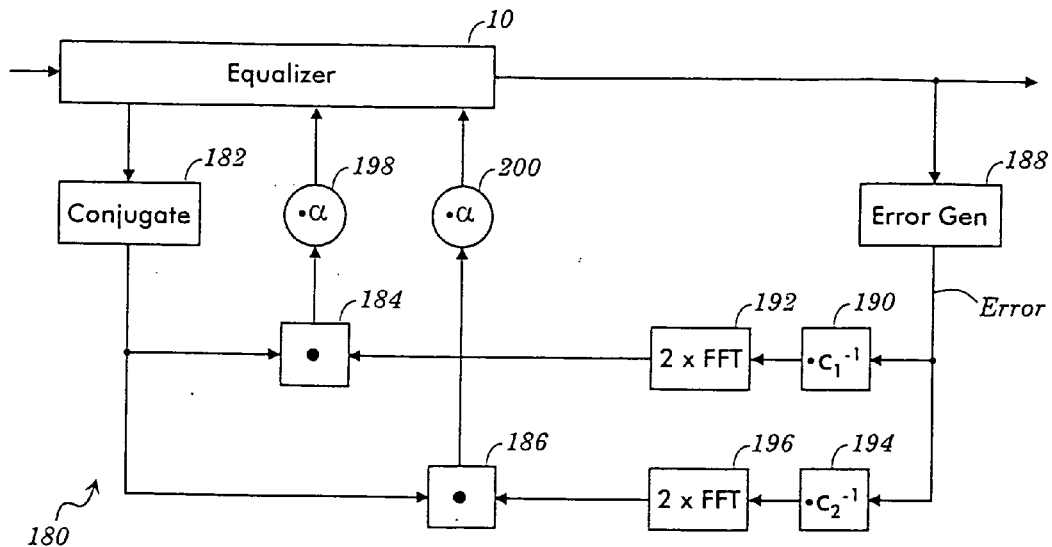
FIG. 14 shows a first embodiment of a converger arranged to control convergence of the dual path equalizer shown in FIG. 3.

As discussed above, the A coefficients may be adaptively controlled by a converger 7 shown in FIG. 2 to ensure that the actual output of the equalizer converges on the correct output, i.e., an output free of ghosts. A first embodiment of the converger 7, i.e., an adaptive coefficient control 180, may be provided for the dual path equalizer 10 and is shown in FIG. 14. The adaptive convergence control 180 includes a conjugater 182 which conjugates the data from the output of the 2xFFT 14 to facilitate the use of an LMS algorithm to converge the A coefficients of the equalizer 10. The data exiting the 2xFFT 14 is complex data. The conjugater 182 conjugates this data by reversing the sign of the imaginary part of the data.

The output of the conjugater 182 is supplied to first and second correlators 184 and 186. An error generator 188, which is discussed more fully below, generates an error based upon the output data from the dual path equalizer 10. This error must be processed in the same manner as the output of the finite filters 16 and 24 of the dual path equalizer 10. Therefore, the adaptive coefficient control 180 includes an inverse first post-processor 190 and a 2xFFT 192. Also, the adaptive coefficient control 180 includes an inverse second post-processor 194 and a 2xFFT 196. The inverse first post-processor 190 and the inverse second post-processor 194 produce the inverse of the first and second post-processors 20 and 28. Additionally, the 2xFFT 192 and the 2xFFT 196 produce the inverse of the first and second $2xFFT^{-1}$ 18 and $2xFFT^{-1}$ 26 of the dual path equalizer 10. The outputs of the first and second 2xFFTs 192 and 196 are supplied to the corresponding correlators 184 and 186.

The correlators 184 and 186 multiply (i) the error from the error generator 188 as processed by the respective inverse first and second post-processors 190 and 194 and the respective first and second 2xFFTs 192 and 196 and (ii) the conjugated output of the 2xFFT 14. This multiplication effects a modified LMS algorithm to produce adjustments values for the A coefficients to converge the equalizer 10. In other words, the outputs of the correlators 184 and 186 are adjustment values of the coefficients $A_1$ and $A_2$ that, when added to the existing coefficients $A_1$ and $A_2$ applied by the dual path equalizer 10, would cause the dual path equalizer 10 to eliminate ghosts from the received signal.

However, instead of correcting the coefficients $A_1$ and $A_2$ in one operation, the coefficients $A_1$ and $A_2$ are adjusted in increments. Therefore, multipliers 198 and 200 multiply the outputs of the correlators 184 and 186 by a quantity $\alpha$, which has a value of less that one. The output of the multiplier 198 is added to the existing coefficients $A_1$ of the first finite filter 16, and the output of the multiplier 200 is added to the existing coefficients $A_2$ of the second finite filter 24. The value $\alpha$ is used so that these coefficients $A_1$ and $A_2$ are corrected in small increments in order to ensure a smooth convergence.

Figure 15:
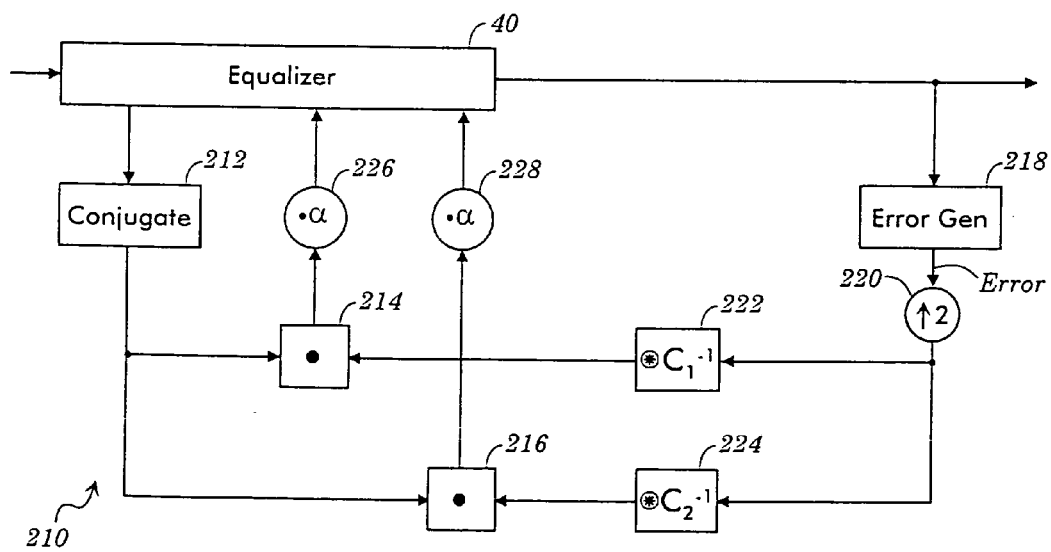
FIG. 15 shows a second embodiment of a converger arranged to control convergence of the dual path equalizer shown in FIG. 5.

A second embodiment of the converger 7, i.e., an adaptive coefficient control 210, may be provided for the dual path equalizer 40 and is shown in FIG. 15. The adaptive convergence control 210 includes a conjugater 212 which conjugates the data from the 2xFFT 44. The output of the conjugater 212 is supplied to first and second correlators 214 and 216. An error generator 218, which is shown in exemplary form in FIG. 18, generates an error based upon the output data of the dual path equalizer 40. This error must be processed in the same manner as the output of the finite filters 46 and 52 of the dual path equalizer 40. Therefore, the adaptive coefficient control 210 includes an up sampler 220 which up samples by two the output of the error generator 218 in order to thereby reverse the effects of the down sampler 59. The adaptive coefficient control 210 also includes an inverse first post-processor 222 and an inverse second post-processor 224. The inverse first post-processor 222 and the inverse second post-processor 224 produce an inverse of the first and second post-processors 48 and 54. The outputs of the inverse first and second post-processors 222 and 224 are supplied to the corresponding correlators 214 and 216.

The correlators 214 and 216 multiply (i) the up sampled error from the error generator 218 as processed by the respective-inverse first and second post-processors 222 and 224 and (ii) the conjugated reference data. In effect, the outputs of the correlators 214 and 216 are adjustment values of the coefficients $A_1$ and $A_2$ that, when added to the existing coefficients $A_1$ and $A_2$ applied by the dual path equalizer 40, would cause the dual path equalizer 40 to eliminate ghosts from the received signal.

Again, instead of correcting the coefficients $A_1$ and $A_2$ with only one operation, the coefficients $A_1$ and $A_2$ are adjusted in increments. Therefore, multipliers 226 and 228 multiply the corresponding outputs of the correlators 214 and 216 by a quantity $\alpha$, which has a value of less that one. The output of the multiplier 226 is added to coefficients $A_1$, and the output of the multiplier 228 is added to the coefficients $A_2$. The value $\alpha$ is used so that the coefficients $A_1$ and $A_2$ are corrected in small increments in order to ensure a smooth convergence.

A third embodiment (not shown) of the converger 7 may be provided for the dual path equalizer 60. In this case, the adaptive coefficient control according to the third embodiment would have the same general arrangement as the adaptive coefficient control 210 shown in FIG. 15. However, the inverse first and second post-processors in this third embodiment would be different from the inverse first and second post-processors 222 and 224 of the adaptive coefficient control 210 because of the difference between the first and second post-processors 48 and 54 of the dual path equalizer 40 and the first and second post-processors 68 and 74 of the dual path equalizer 60.

Figure 16:
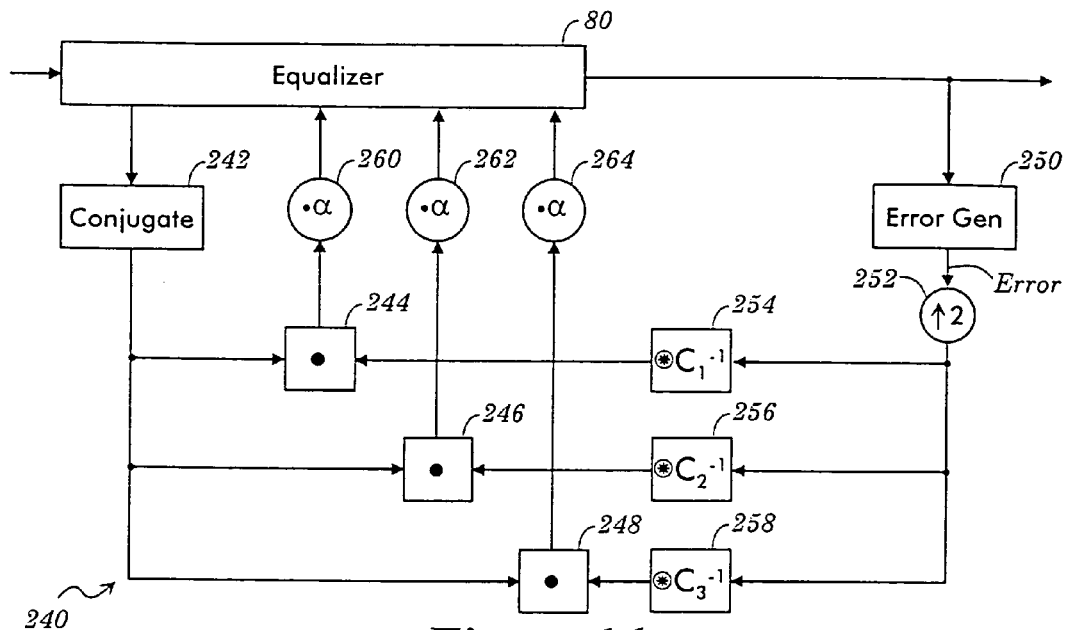
FIG. 16 shows a fourth embodiment of a converger arranged to control convergence of the triple path equalizer shown in FIG. 8.

A fourth embodiment of the converger 7, i.e., an adaptive coefficient control 240, may be provided for the triple path equalizer 80 and is shown in FIG. 16. The adaptive convergence control 240 includes a conjugater 242 which conjugates the data from the 2xFFT 84. The output of the conjugater 242 is supplied to first, second, and third correlators 244, 246, and 248. An error generator 250 generates an error based upon the output of the triple path equalizer 80. The adaptive convergence control 240 includes an up sampler 252 which up samples by two the output of the error generator 250 in order to thereby reverse the effects of the down sampler 106. The adaptive coefficient control 240 also includes an inverse first post-processor 254, an inverse second post-processor 256, and an inverse third post-processor 258. The inverse first, second, and third post-processors 254, 256, and 258 produce an inverse of the first, second, and third post-processors 88, 94, and 100 of the triple path equalizer 80. The outputs of the inverse first, second, and third post-processors 254, 256, and 258 are supplied to the corresponding correlators 244, 246, and 248.

The correlators 244, 246, and 248 multiply (i) the up sampled error from the error generator 250 as processed by the respective inverse first, second, and third post-processors 254, 256, and 258 and (ii) the conjugated output of the 2xFFT 84. In effect, the outputs of the correlators 244, 246, and 248 are adjustment values of the coefficients $A_1$, $A_2$, and $A_3$ that, when added to the existing coefficients $A_1$, $A_2$, and $A_3$ applied by the triple path equalizer 80, would cause the triple path equalizer 80 to substantially eliminate ghosts from the received signal.

Multipliers 260, 262, and 264 multiply the outputs of the correlators 244, 246, and 248 by a quantity $\alpha$, which has a value of less that one. The output of the multiplier 260 is added to coefficients $A_1$, the output of the multiplier 262 is added to the coefficients $A_2$, and the output of the multiplier 264 is added to the coefficients $A_3$.

Figure 17:
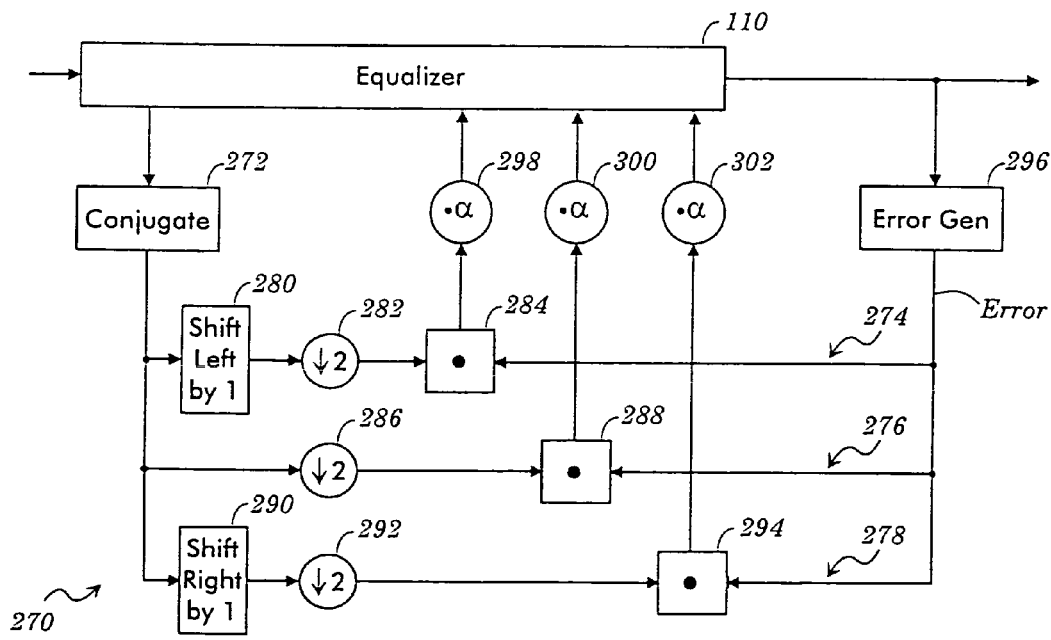
FIG. 17 shows a fifth embodiment of a converger arranged to control convergence of the triple path equalizer shown in FIG. 9; and, FIG. 18 shows an exemplary error generator that may be used for the error generators of the convergence controls shown in FIGS. 14, 15, 16, and 17.

A fifth embodiment of the converger 7, i.e., an adaptive coefficient control 270, may be provided for the triple path equalizer 110 and is shown in FIG. 17. The adaptive convergence control 270 includes a conjugater 272 which conjugates the data from the 2xFFT 114. The output of the conjugater 272 is processed along first, second, and third control paths 274, 276, and 278 which correspond to the first, second, and third paths 122, 128, and 136 of the triple path equalizer 110. The first control path 274 includes a left one-sample shifter 280, a first by-two down sampler 282, and a first correlator 284. The left one-sample shifter 280 and the first by-two down sampler 282 replicate the processing of the left one-sample shifter 116 and the first by-two down sampler 118 in the first path 122 of the triple path equalizer 110. The second control path 276 includes a second by-two down sampler 286 and a second correlator 288. The second by-two down sampler 286 replicates the processing of the second by-two down sampler 124 in the second path 128 of the triple path equalizer 110. The third control path 278 includes a right one-sample shifter 290, a third by-two down sampler 292, and a third correlator 294. The right one-sample shifter 290 and the third by-two down sampler 292 replicate the processing of the right one-sample shifter 130 and the third by-two down sampler 132 in the third path 136 of the triple path equalizer 110. An error generator 296 generates an error based upon the output of the triple path equalizer 110.

The error from the error generator 296 is supplied to the correlators 284, 288, and 294. The correlators 284, 288, and 294 multiply the error from the error generator 296 and the respective outputs of the first, second, and third by-two down samplers 282, 286, and 292. In effect, the outputs of the correlators 284, 288, and 294 are adjustment values of the coefficients $A_1$, $A_2$, and $A_3$ that, when added to the existing coefficients $A_1$, $A_2$, and $A_3$ applied by the triple equalizer 110, would cause the triple path equalizer 110 to eliminate ghosts from the received signal.

Multipliers 298, 300, and 302 multiply the outputs of the correlators 284, 288, and 294 by a quantity $\alpha$, which has a value of less that one. The output of the multiplier 298 is added to the existing coefficients $A_1$, the output of the multiplier 300 is added to the existing coefficients $A_2$, and the output of the multiplier 302 is added to the existing coefficients $A_3$.

By the same token, the adaptive coefficient control 270 can be generalized in order to converge the output of the multipath equalizer 140 into a ghost free signal, and the adaptive coefficient control 210 can be generalized in order to converge the output of the multipath equalizer 160 into a ghost free signal.

Figure 18:
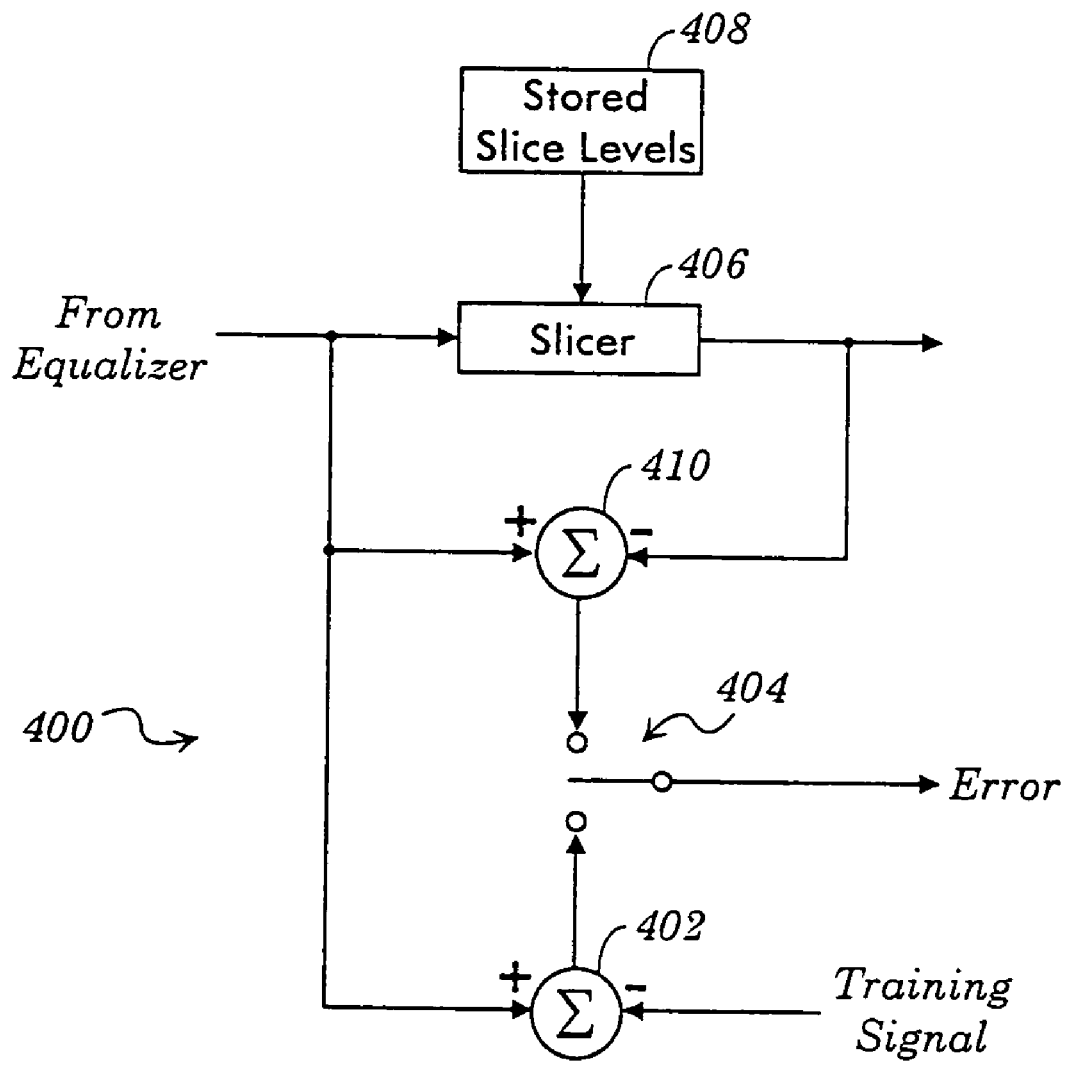

An error generator 400 is shown in FIG. 18 and may be used for the error generators 188, 218, 250, and 296. The adaptive coefficient controls of the present invention may be operated in either a training mode or a data directed mode. During the training mode, a training signal is transmitted by a transmitter to the corresponding equalizer. A summer 402 subtracts the training signal (which may be locally stored or generated) from the output of the equalizer (which is the received training signal) and supplies this difference to a switch 404. During the data directed mode, the data output of the equalizer is sliced by a slicer 406 using stored slice levels 408 in order to generate as an output the one stored slice level which is closest to the received data. The stored slice levels 408 are the reference in the data directed mode. A summer 410 subtracts the stored slice level provided by the slicer 406 from the output of the equalizer and supplies this difference to the switch 404. The switch 404 selects either the output of the summer 402 or the output from the summer 410 as the error which is processed by the particular adaptive coefficient control according to the various descriptions above. The switch 404 may be operated by the synchronizer 6 shown in FIG. 2.

The switch 404 may select the output of the summer 402 (i.e., the training mode) during system start up when the A coefficients do not have values likely to produce meaningful output data. Once the equalizer has been coarsely converged during the training mode, the switch 404 may be switched to select the output of the summer 410 (i.e., the data directed mode) so that data can be used in order to achieve and maintain precise convergence of the equalizer.

Certain modifications and alternatives of the present invention have been discussed above. Other modifications and alternatives will occur to those practicing in the art of the present invention. For example, because the present invention operates most satisfactorily in the presence of ghosts and other linear distortions, the term ghost as used herein in connection with the present invention includes ghosts and/or other linear distortions.

Also, the Fast Fourier Transforms and inverse Fast Fourier Transforms described above can have lengths other than those described above.

Furthermore, the invention has been described above as if a single ghost is received. In the case where multiple ghosts are received, it may be desirable to apply multiple sets of the coefficients to the received signal or a single set tailored for multiple ghosts. Also, the spacing between coefficients is described above as being the interval d. However, in the case where the interval d is not evenly divisible into the block length of a data block, or in the case where more than one ghost are received, the spacing between the coefficients may be other than the interval d.

The guard interval discussed above may have any desired values including zero.

Moreover, as described above, the error generated by the error generator 400 is correlated with the conjugated output of a 2xFFT that is part of the corresponding equalizer, and this correlation is used to adjust the appropriate A coefficients. Instead, the error generated by the error generator 400 could be used in a zero forcing method to directly adjust the appropriate A coefficients without correlation with the conjugated output of the corresponding 2xFFT. The zero forcing method, however, may not suitably account for noise in the input.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of equalizing a signal, wherein the signal comprises a series of input blocks of coded data, the method comprising at least the following steps:
   a) shifting data in each input block of data to the left;
   b) complex multiplying each of the left shifted input block of data by a first set of equalizer coefficients to provide respective first adjusted output blocks of data, wherein step b) is not a full solution to ghosts;
   c) complex multiplying each of the input blocks of data by a second set of equalizer coefficients to provide respective second adjusted output blocks of data, wherein step c) is not a full solution to ghosts;
   d) shifting the data in each input block of data to the right;
   e) complex multiplying each of the right shifted input block of data by a third set of equalizer coefficients to provide respective third adjusted output blocks of data, wherein step e) is not a full solution to ghosts;
   f) adding corresponding ones of the first, second, and third adjusted output blocks of data; and,
   g) controlling the first, second, and third sets of equalizer coefficients so that, as a result of the addition performed according to step f), a substantially full solution to ghosts is obtained.

2. The method of claim 1 wherein step g) comprises the following steps:
   estimating the channel; and,
   controlling the first, second, and third sets of equalizer coefficients based upon the estimated channel.

3. The method of claim 1 wherein step g) comprises the step of controlling the first, second, and third sets of equalizer coefficients based upon the addition of step f).

4. The method of claim 1 wherein step g) comprises the following steps:
   g1) performing a comparison based upon the addition of step f) and the input blocks of data; and,
   g2) controlling the first, second, and third sets of equalizer coefficients based upon the comparison performed in step g1).

5. The method of claim 1 wherein step g) comprises the following steps:
   g1) comparing results of the addition of step f) to a reference to form an error;
   g2) conjugating the input blocks of data;
   g3) shifting data in the conjugated input blocks of data to the left;
   g4) shifting the data in the conjugated input blocks of data to the right;
   g5) correlating the left shifted, conjugated input blocks of data and the error;
   g6) correlating the conjugated input blocks of data and the error;
   g7) correlating the right shifted, conjugated input blocks of data and the error;
   g8) controlling the first set of equalizer coefficients based upon the correlation performed at step g5);
   g9) controlling the second set of equalizer coefficients based upon the correlation performed at step g6); and,
   g10) controlling the third set of equalizer coefficients based upon the correlation performed at step g7).

6. The method of claim 5 wherein step g5) comprises the step of down sampling the left shifted, conjugated input blocks of data, wherein step g6) comprises the step of down sampling the conjugated input blocks of data, and wherein step g7) comprises the step of down sampling the right shifted, conjugated input blocks of data.

7. The method of claim 5 wherein the reference is a training signal.

8. The method of claim 5 wherein the reference is sliced data.

9. The method of claim 1 wherein step g) comprises the following steps:
   g1) comparing results of the addition of step f) to a reference to form an error;
   g2) performing a left shift based upon the input blocks of data;
   g3) performing a right shift based upon the input blocks of data;
   g4) performing a first correlation based upon results from step g2) and the error;
   g5) performing a second correlation based upon the input blocks of data and the error;
   g6) performing a third correlation based upon results from step g3) and the error;

g7) controlling the first set of equalizer coefficients based upon the first correlation;
g8) controlling the second set of equalizer coefficients based upon the second correlation; and,
g9) controlling the third set of equalizer coefficients based upon the third correlation.

10. The method of claim 9 wherein the reference is a training signal.

11. The method of claim 9 wherein the reference is sliced data.

12. The method of claim 1 wherein step g) comprises the following steps:
g1) conjugating the input blocks of data;
g2) shifting data in the conjugated input blocks of data to the left;
g3) shifting the data in the conjugated input blocks of data to the right;
g4) performing a first correlation based upon the left shifted, conjugated input blocks of data and the addition of step f);
g5) performing a second correlation based upon the conjugated input blocks of data and the addition of step f);
g6) performing a third correlation based upon the right shifted, conjugated input blocks of data and the addition of step f);
g7) controlling the first set of equalizer coefficients based upon the first correlation;
g8) controlling the second set of equalizer coefficients based upon the second correlation; and,
g9) controlling the third set of equalizer coefficients based upon the third correlation.

13. The method of claim 1 wherein step g) comprises the following steps:
g1) performing a left shift based upon the input blocks of data;
g2) performing a right shift based upon the input blocks of data;
g3) performing a first correlation based upon results from step g1) and the first, second, and third adjusted output blocks of data;
g4) performing a second correlation based upon the input blocks of data and the first, second, and third adjusted output blocks of data;
g5) performing a third correlation based upon results from step g2) and the first, second, and third adjusted output blocks of data;
g6) controlling the first set of equalizer coefficients based upon the first correlation;
g7) controlling the second set of equalizer coefficients based upon the second correlation; and,
g8) controlling the third set of equalizer coefficients based upon the third correlation.

14. The method of claim 1 further comprising the step of h) applying pre-processing coefficients to each data block prior to steps a), c), and d).

15. The method of claim 14 wherein step g) comprises the step of controlling a width of the pre-processing coefficients so that the width of the pre-processing coefficients is substantially commensurate with a width of a data block and an interval between a data block and a ghost.

16. The method of claim 14 wherein step g) comprises the following steps:
estimating the channel; and,
controlling the first, second, and third sets of equalizer coefficients based upon the estimated channel.

17. The method of claim 14 wherein step g) comprises the step of controlling the first, second, and third sets of equalizer coefficients based upon the addition of step f).

18. The method of claim 14 wherein step g) comprises the following steps:
g1) performing a comparison based upon the addition of step f) and the input blocks of data; and,
g2) controlling the first, second, and third sets of equalizer coefficients based upon the comparison performed in step g1).

19. The method of claim 14 wherein step g) comprises the following steps:
g1) comparing results of the addition of step f) to a reference to form an error;
g2) conjugating the input blocks of data;
g3) performing a correlation based upon the error and the conjugated input blocks of data; and,
g4) controlling the first, second, and third sets of equalizer coefficients based upon the correlation.

20. The method of claim 19 wherein the reference is a training signal.

21. The method of claim 19 wherein the reference is sliced data.

22. The method of claim 14 wherein step g) comprises the following steps:
g1) comparing results of the addition of step f) to a reference to form an error;
g2) conjugating the input blocks of data;
g3) shifting data in the conjugated input blocks of data to the left;
g4) shifting the data in the conjugated input blocks of data to the right;
g5) correlating the left shifted, conjugated input blocks of data and the error;
g6) correlating the conjugated input blocks of data and the error;
g7) correlating the right shifted, conjugated input blocks of data and the error;
g8) controlling the first set of equalizer coefficients based upon the correlation performed at step g5);
g9) controlling the second set of equalizer coefficients based upon the correlation performed at step g6); and,
g10) controlling the third set of equalizer coefficients based upon the correlation performed at step g7).

23. The method of claim 22 wherein step g5) comprises the step of down sampling the left shifted, conjugated input blocks of data, wherein step g6) comprises the step of down sampling the conjugated input blocks of data, and wherein step g7) comprises the step of down sampling the right shifted, conjugated input blocks of data.

24. The method of claim 22 wherein the reference is a training signal.

25. The method of claim 22 wherein the reference is sliced data.

26. The method of claim 14 wherein step g) comprises the following steps:
g1) comparing results of the addition of step f) to reference data to form an error;
g2) performing a left shift based upon the input blocks of data;
g3) performing a right shift based upon the input blocks of data;
g4) performing a first correlation based upon results from step g2) and the error;
g5) performing a second correlation based upon the input blocks of data and the error;

g6) performing a third correlation based upon results from step g3) and the error;
g7) controlling the first set of equalizer coefficients based upon the first correlation;
g8) controlling the second set of equalizer coefficients based upon the second correlation; and,
g9) controlling the third set of equalizer coefficients based upon the third correlation.

27. The method of claim 26 wherein the reference is a training signal.

28. The method of claim 26 wherein the reference is sliced data.

29. The method of claim 14 wherein step g) comprises the following steps:
g1) conjugating the input blocks of data;
g2) shifting data in the conjugated input blocks of data to the left;
g3) shifting the data in the conjugated input blocks of data to the right;
g4) performing a first correlation based upon the left shifted, conjugated input blocks of data and the addition of step f);
g5) performing a second correlation based upon the conjugated input blocks of data and the addition of step f);
g6) performing a third correlation based upon the right shifted, conjugated input blocks of data and the addition of step f);
g7) controlling the first set of equalizer coefficients based upon the first correlation;
g8) controlling the second set of equalizer coefficients based upon the second correlation; and,
g9) controlling the third set of equalizer coefficients based upon the third correlation.

30. The method of claim 14 wherein step g) comprises the following steps:
g1) performing a left shift based upon the input blocks of data;
g2) performing a right shift based upon the input blocks of data;
g3) performing a first correlation based upon results from step g1) and the first, second, and third adjusted output blocks of data;
g4) performing a second correlation based upon the input blocks of data and the first, second, and third adjusted output blocks of data;
g5) performing a third correlation based upon results from step g2) and the first, second, and third adjusted output blocks of data;
g6) controlling the first set of equalizer coefficients based upon the first correlation;
g7) controlling the second set of equalizer coefficients based upon the second correlation; and,
g8) controlling the third set of equalizer coefficients based upon the third correlation.

31. The method of claim 14 wherein the pre-processing coefficients are curved.

32. The method of claim 14 wherein the pre-processing coefficients are curved substantially according to a function $1/(2-\cos(t))$.

33. The method of claim 1 further comprising the step of applying a spectral transformation to each data block prior to steps a), c), and d), wherein the spectral transformation is longer than a data block.

34. An equalizer for processing blocks of data comprising:

n−1 data shifters, wherein each of the n−1 data shifters shifts the blocks of data;
n finite filters, wherein one of the n finite filters applies a corresponding set of finite filter coefficients to the blocks of data, wherein each of the other n−1 finite filters applies a set of finite filter coefficients to a corresponding output of the n−1 data shifters, wherein ghosts of the blocks of data are not eliminated as a result of the application of the sets of finite filter coefficients corresponding to the n finite filters, and wherein n>2;
an adder arranged to add outputs from the n finite filters; and,
a controller arranged to control the sets of finite filter coefficients corresponding to the n finite filters so that the addition performed by the adder substantially eliminates the ghosts.

35. The equalizer of claim 34 wherein the controller comprises a channel estimator that estimates the channel through which the blocks of data are transmitted.

36. The equalizer of claim 34 wherein the controller controls the n sets of finite filter coefficients based upon an output of the adder.

37. The equalizer of claim 34 wherein the controller comprises a comparator that performs a comparison based upon an output of the adder and the blocks of data.

38. The equalizer of claim 34 wherein the controller comprises:
a comparator arranged to compare an output of the adder to a reference to form an error;
a conjugator arranged to conjugate the blocks of data;
n−1 data shifters arranged to shift the conjugated blocks of data; and,
n correlators arranged to perform n−1 correlations of the shifted, conjugated blocks of data and the error and to perform one correlation of the conjugated blocks of data and the error, wherein each of the n correlators is arranged to control a corresponding set of equalizer coefficients.

39. The equalizer of claim 38 wherein the controller further comprises n down samplers, wherein n−1 of the n down samplers are arranged to down sample the shifted, conjugated blocks of data prior upstream of the correlators, and wherein the other down sampler is arranged to down sample the conjugated blocks of data upstream of the correlators.

40. The equalizer of claim 38 wherein the reference is a training signal.

41. The equalizer of claim 38 wherein the reference is sliced data.

42. The equalizer of claim 34 wherein the controller comprises:
a comparator arranged to compare an output of the adder to a reference to form an error;
n−1 data shifters arranged to shift the blocks of data; and,
n correlators arranged to perform n−1 correlations based upon the shifted blocks of data and the error and to perform one correlation based upon the blocks of data and the error, wherein each of the n correlators is arranged to control a corresponding set of equalizer coefficients.

43. The equalizer of claim 42 wherein the reference is a training signal.

44. The equalizer of claim 42 wherein the reference is sliced data.

45. The equalizer of claim 34 wherein the controller comprises:

a conjugator arranged to conjugate the blocks of data;

n−1 data shifters arranged to shift the conjugated blocks of data;

n correlators arranged to perform n−1 correlations based upon the shifted, conjugated blocks of data and an output of the adder and to perform one correlation based upon the conjugated blocks of data and the output of the adder, wherein each of the n correlators is arranged to control a corresponding set of equalizer coefficients.

46. The equalizer of claim 34 wherein the controller comprises:

n−1 data shifters arranged to shift the blocks of data; and, n correlators arranged to perform n−1 correlations based upon the shifted blocks of data and an output of the adder and to perform one correlation based upon the blocks of data and the output of the adder, wherein each of the n correlators is arranged to control a corresponding set of equalizer coefficients.

47. The equalizer of claim 34 further comprising a pre-processor that applies pre-processor coefficients to each data block upstream of the n−1 data shifters and the n finite filters.

48. The equalizer of claim 47 wherein the controller controls a width of the pre-processing coefficients so that the width is substantially coincident with the width of a data block and an interval between a data block and a ghost.

49. The equalizer of claim 47 wherein the pre-processing coefficients are curved.

50. The equalizer of claim 47 wherein the pre-processing coefficients are curved substantially according to a function $1/(2-\cos(t))$.

51. The equalizer of claim 47 wherein the controller comprises a channel estimator that estimates the channel through which the blocks of data are transmitted.

52. The equalizer of claim 47 wherein the controller controls the n sets of finite filter coefficients based upon an output of the adder.

53. The equalizer of claim 47 wherein the controller comprises a comparator that performs a comparison based upon an output of the adder and the blocks of data.

54. The equalizer of claim 47 wherein the controller comprises:

a comparator arranged to compare an output of the adder to a reference to form an error;

a conjugator arranged to conjugate the blocks of data;

n−1 data shifters arranged to shift the conjugated blocks of data; and, n correlators arranged to perform n−1 correlations of the shifted, conjugated blocks of data and the error and to perform one correlation of the conjugated blocks of data and the error, wherein each of the n correlators is arranged to control a corresponding set of equalizer coefficients.

55. The equalizer of claim 54 wherein the controller further comprises n down samplers, wherein n−1 of the n down samplers are arranged to down sample the shifted, conjugated blocks of data prior upstream of the correlators, and wherein the other down sampler is arranged to down sample the conjugated blocks of data upstream of the correlators.

56. The equalizer of claim 54 wherein the reference is a training signal.

57. The equalizer of claim 54 wherein the reference is sliced data.

58. The equalizer of claim 47 wherein the controller comprises:

a comparator arranged to compare an output of the adder to a reference to form an error;

n−1 data shifters arranged to shift the blocks of data; and, n correlators arranged to perform n−1 correlations based upon the shifted blocks of data and the error and to perform one correlation based upon the blocks of data and the error, wherein each of the n correlators is arranged to control a corresponding set of equalizer coefficients.

59. The equalizer of claim 58 wherein the reference is a training signal.

60. The equalizer of claim 58 wherein the reference is sliced data.

61. The equalizer of claim 47 wherein the controller comprises:

a conjugator arranged to conjugate the blocks of data;

n−1 data shifters arranged to shift the conjugated blocks of data;

n correlators arranged to perform n−1 correlations based upon the shifted, conjugated blocks of data and an output of the adder and to perform one correlation based upon the conjugated blocks of data and the output of the adder, wherein each of the n correlators is arranged to control a corresponding set of equalizer coefficients.

62. The equalizer of claim 47 wherein the controller comprises:

n−1 data shifters arranged to shift the blocks of data; and, n correlators arranged to perform n−1 correlations based upon the shifted blocks of data and an output of the adder and to perform one correlation based upon the blocks of data and the output of the adder, wherein each of the n correlators is arranged to control a corresponding set of equalizer coefficients.

63. The equalizer of claim 34 wherein n>4.

64. The equalizer of claim 34 further comprising a spectral transformation applied to each data block upstream of the n−1 data shifters and the n finite filters, wherein the spectral transformation is longer than a block of data.

65. An equalizer for processing blocks of data comprising:

a first data shifter, wherein the first data shifter is arranged to shift the data left by two;

a second data shifter, wherein the second data shifter is arranged to shift the data left by one;

a third data shifter, wherein the third data shifter is arranged to shift the data right by one;

a fourth data shifter, wherein the fourth data shifter is arranged to shift the data right by two;

a first finite filter, wherein the first finite filter applies a first set of finite filter coefficients to each of the blocks of data which have been shifted by the first data shifter, wherein ghosts of the blocks of data are not eliminated as a result of the application of the first set of finite filter coefficients;

a second finite filter, wherein the second finite filter applies a second set of finite filter coefficients to each of the blocks of data which have been shifted by the second data shifter, wherein ghosts of the blocks of data are not eliminated as a result of the application of the second set of finite filter coefficients;

a third finite filter, wherein the third finite filter applies a third set of finite filter coefficients to each of the blocks of data, wherein ghosts of the blocks of data are not eliminated as a result of the application of the third set of finite filter coefficients;

a fourth finite filter, wherein the fourth finite filter applies a fourth set of finite filter coefficients to each of the blocks of data which have been shifted by the third data shifter, wherein ghosts of the blocks of data are not eliminated as a result of the application of the fourth set of finite filter coefficients;

a fifth finite filter, wherein the fifth finite filter applies a fifth set of finite filter coefficients to each of the blocks of data which have been shifted by the fourth data shifter, wherein ghosts of the blocks of data are not eliminated as a result of the application of the fifth set of finite filter coefficients;

an adder arranged to add outputs from the first, second, third, fourth, and fifth finite filters; and, a controller arranged to control the first, second, third, fourth, and fifth sets of finite filter coefficients so that the addition performed by the adder substantially eliminates the ghosts.

66. The equalizer of claim 65 wherein the controller comprises a channel estimator that estimates the channel through which the blocks of data are transmitted.

67. The equalizer of claim 65 wherein the controller controls the first, second, third, fourth, and fifth sets of finite filter coefficients based upon an output of the adder.

68. The equalizer of claim 65 wherein the controller comprises a comparator that performs a comparison based upon an output of the adder and the blocks of data.

69. The equalizer of claim 65 wherein the controller comprises:
   a comparator arranged to compare an output of the adder to a reference to form an error;
   a conjugator arranged to conjugate the blocks of data;
   a first data shifter arranged to shift the conjugated blocks of data left by two;
   a second data shifter arranged to shift the conjugated blocks of data left by one;
   a third data shifter arranged to shift the conjugated blocks of data right by one;
   a fourth data shifter arranged to shift the conjugated blocks of data right by two;
   a first correlator arranged to perform a correlation of the error and the conjugated blocks of data shifted by the first data shifter, wherein the first correlator is arranged to control the first set of finite filter coefficients;
   a second correlator arranged to perform a correlation of the error and the conjugated blocks of data shifted by the second data shifter, wherein the second correlator is arranged to control the second set of finite filter coefficients;
   a third correlator arranged to perform a correlation of the error and the conjugated blocks of data, wherein the third correlator is arranged to control the third set of finite filter coefficients;
   a fourth correlator arranged to perform a correlation of the error and the conjugated blocks of data shifted by the third data shifter, wherein the fourth correlator is arranged to control the fourth set of finite filter coefficients; and,
   a fifth correlator arranged to perform a correlation of the error and the conjugated blocks of data shifted by the fourth data shifter, wherein the fifth correlator is arranged to control the fifth set of finite filter coefficients.

70. The equalizer of claim 69 wherein the controller further comprises a down sampler upstream of each of the first, second, third, fourth, and fifth correlators, wherein the down samplers are arranged to down sample the conjugated blocks of data.

71. The equalizer of claim 69 wherein the reference is a training signal.

72. The equalizer of claim 69 wherein the reference is sliced data.

73. The equalizer of claim 65 wherein the controller comprises:
   a comparator arranged to compare an output of the adder to a reference to form an error;
   a first data shifter arranged to perform a shift left by two based upon the blocks of data;
   a second data shifter arranged to perform a shift left by one based upon the blocks of data;
   a third data shifter arranged to perform a shift right by one based upon the blocks of data;
   a fourth data shifter arranged to perform a shift right by two based upon the blocks of data;
   a first correlator arranged to perform a correlation of an output of the first data shifter and the error, wherein the first correlator is arranged to control the first set of finite filter coefficients;
   a second correlator arranged to perform a correlation of an output of the second data shifter and the error, wherein the second correlator is arranged to control the second set of finite filter coefficients;
   a third correlator arranged to perform a correlation based upon the blocks of data and the error, wherein the third correlator is arranged to control the third set of finite filter coefficients;
   a fourth correlator arranged to perform a correlation of an output of the third data shifter and the error, wherein the fourth correlator is arranged to control the fourth set of finite filter coefficients; and,
   a fifth correlator arranged to perform a correlation of an output of the fourth data shifter and the error, wherein the fifth correlator is arranged to control the fifth set of finite filter coefficients.

74. The equalizer of claim 73 wherein the reference is a training signal.

75. The equalizer of claim 73 wherein the reference is sliced data.

76. The equalizer of claim 65 wherein the controller comprises:
   a conjugator arranged to conjugate the blocks of data;
   a first data shifter arranged to shift the conjugated blocks of data left by two;
   a second data shifter arranged to shift the conjugated blocks of data left by one;
   a third data shifter arranged to shift the conjugated blocks of data right by one;
   a fourth data shifter arranged to shift the conjugated blocks of data right by two;
   a first correlator arranged to perform a correlation based upon an output of the adder and the conjugated blocks of data shifted by the first data shifter, wherein the first correlator is arranged to control the first set of finite filter coefficients;
   a second correlator arranged to perform a correlation based upon the output of the adder and the conjugated blocks of data shifted by the second data shifter, wherein the second correlator is arranged to control the second set of finite filter coefficients;
   a third correlator arranged to perform a correlation based upon the output of the adder and the conjugated blocks of data, wherein the third correlator is arranged to control the third set of finite filter coefficients;
a fourth correlator arranged to perform a correlation based upon the output of the adder and the conjugated blocks of data shifted by the third data shifter, wherein the fourth correlator is arranged to control the fourth set of finite filter coefficients; and,
a fifth correlator arranged to perform a correlation based upon the output of the adder and the conjugated blocks of data shifted by the fourth data shifter, wherein the fifth correlator is arranged to control the fifth set of finite filter coefficients.

77. The equalizer of claim 65 wherein the controller comprises:
a first data shifter arranged to perform a shift left by two operation based upon the blocks of data;
a second data shifter arranged to perform a shift left by one operation based upon the blocks of data;
a third data shifter arranged to perform a shift right by one operation based upon the blocks of data;
a fourth data shifter arranged to perform a shift right by two operation based upon the blocks of data;
a first correlator arranged to perform a correlation based upon an output of the adder and an output of the first data shifter, wherein the first correlator is arranged to control the first set of finite filter coefficients;
a second correlator arranged to perform a correlation based upon the output of the adder and an output of the second data shifter, wherein the second correlator is arranged to control the second set of finite filter coefficients;
a third correlator arranged to perform a correlation based upon the output of the adder and the blocks of data, wherein the third correlator is arranged to control the third set of finite filter coefficients;
a fourth correlator arranged to perform a correlation based upon the output of the adder and an output of the third data shifter, wherein the fourth correlator is arranged to control the fourth set of finite filter coefficients; and,
a fifth correlator arranged to perform a correlation based upon the output of the adder and an output of the fourth data shifter, wherein the fifth correlator is arranged to control the fifth set of finite filter coefficients.

78. The equalizer of claim 65 further comprising a pre-processor that applies pre-processor coefficients to each block of data upstream of the first, second, third, and fourth data shifters and upstream of the third finite filter, wherein the controller controls a width of the pre-processing coefficients so that the width is substantially coincident with the width of a block of data and an interval between a block of data and a ghost.

79. The equalizer of claim 78 wherein the controller comprises a channel estimator that estimates the channel through which the blocks of data are transmitted.

80. The equalizer of claim 78 wherein the controller controls the first, second, third, fourth, and fifth sets of finite filter coefficients based upon an output of the adder.

81. The equalizer of claim 78 wherein the controller comprises a comparator that performs a comparison based upon an output of the adder and the blocks of data.

82. The equalizer of claim 78 wherein the controller comprises:
a comparator arranged to compare an output of the adder to a reference to form an error;
a conjugator arranged to conjugate the blocks of data;
a first data shifter arranged to shift the conjugated blocks of data left by two;
a second data shifter arranged to shift the conjugated blocks of data left by one;
a third data shifter arranged to shift the conjugated blocks of data right by one;
a fourth data shifter arranged to shift the conjugated blocks of data right by two;
a first correlator arranged to perform a correlation of the error and the conjugated blocks of data shifted by the first data shifter, wherein the first correlator is arranged to control the first set of finite filter coefficients;
a second correlator arranged to perform a correlation of the error and the conjugated blocks of data shifted by the second data shifter, wherein the second correlator is arranged to control the second set of finite filter coefficients;
a third correlator arranged to perform a correlation of the error and the conjugated blocks of data, wherein the third correlator is arranged to control the third set of finite filter coefficients;
a fourth correlator arranged to perform a correlation of the error and the conjugated blocks of data shifted by the third data shifter, wherein the fourth correlator is arranged to control the fourth set of finite filter coefficients; and,
a fifth correlator arranged to perform a correlation of the error and the conjugated blocks of data shifted by the fourth data shifter, wherein the fifth correlator is arranged to control the fifth set of finite filter coefficients.

83. The equalizer of claim 82 wherein the controller further comprises a down sampler upstream of each of the first, second, third, fourth, and fifth correlators, wherein the down samplers are arranged to down sample the conjugated blocks of data prior.

84. The equalizer of claim 82 wherein the reference is a training signal.

85. The equalizer of claim 82 wherein the reference is sliced data.

86. The equalizer of claim 78 wherein the controller comprises:
a comparator arranged to compare an output of the adder to a reference to form an error;
a first data shifter arranged to perform a shift left by two based upon the blocks of data;
a second data shifter arranged to perform a shift left by one based upon the blocks of data;
a third data shifter arranged to perform a shift right by one based upon the blocks of data;
a fourth data shifter arranged to perform a shift right by two based upon the blocks of data;
a first correlator arranged to perform a correlation of the error and an output of the first data shifter, wherein the first correlator is arranged to control the first set of finite filter coefficients;
a second correlator arranged to perform a correlation of the error and an output of the second data shifter, wherein the second correlator is arranged to control the second set of finite filter coefficients;
a third correlator arranged to perform a correlation based upon the error and the blocks of data, wherein the third correlator is arranged to control the third set of finite filter coefficients;
a fourth correlator arranged to perform a correlation of the error and an output of the third data shifter, wherein the fourth correlator is arranged to control the fourth set of finite filter coefficients; and, a fifth correlator arranged to perform a correlation of the error and an output of the fourth data shifter, wherein the fifth correlator is arranged to control the fifth set of finite filter coefficients.

87. The equalizer of claim 86 wherein the reference is a training signal.

88. The equalizer of claim 86 wherein the reference is sliced data.

89. The equalizer of claim 78 wherein the controller comprises:
- a conjugator arranged to conjugate the blocks of data;
- a first data shifter arranged to shift the conjugated blocks of data left by two;
- a second data shifter arranged to shift the conjugated blocks of data left by one;
- a third data shifter arranged to shift the conjugated blocks of data right by one;
- a fourth data shifter arranged to shift the conjugated blocks of data right by two;
- a first correlator arranged to perform a correlation based upon an output of the adder and the conjugated blocks of data shifted by the first data shifter, wherein the first correlator is arranged to control the first set of finite filter coefficients;
- a second correlator arranged to perform a correlation based upon the output of the adder and the conjugated blocks of data shifted by the second data shifter, wherein the second correlator is arranged to control the second set of finite filter coefficients;
- a third correlator arranged to perform a correlation based upon the output of the adder and the conjugated blocks of data, wherein the third correlator is arranged to control the third set of finite filter coefficients;
- a fourth correlator arranged to perform a correlation based upon the output of the adder and the conjugated blocks of data shifted by the third data shifter, wherein the fourth correlator is arranged to control the fourth set of finite filter coefficients; and,
- a fifth correlator arranged to perform a correlation based upon the output of the adder and the conjugated blocks of data shifted by the fourth data shifter, wherein the fifth correlator is arranged to control the fifth set of finite filter coefficients.

90. The equalizer of claim 78 wherein the controller comprises:
- a first data shifter arranged to perform a shift left by two operation based upon the blocks of data;
- a second data shifter arranged to perform a shift left by one operation based upon the blocks of data;
- a third data shifter arranged to perform a shift right by one operation based upon the blocks of data;
- a fourth data shifter arranged to perform a shift right by two operation based upon the blocks of data;
- a first correlator arranged to perform a correlation based upon an output of the adder and an output of the first data shifter, wherein the first correlator is arranged to control the first set of finite filter coefficients;
- a second correlator arranged to perform a correlation based upon the output of the adder and an output of the second data shifter, wherein the second correlator is arranged to control the second set of finite filter coefficients;
- a third correlator arranged to perform a correlation based upon the output of the adder and the blocks of data, wherein the third correlator is arranged to control the third set of finite filter coefficients;
- a fourth correlator arranged to perform a correlation based upon the output of the adder and an output of the third data shifter, wherein the fourth correlator is arranged to control the fourth set of finite filter coefficients; and,
- a fifth correlator arranged to perform a correlation based upon the output of the adder and an output of the fourth data shifter, wherein the fifth correlator is arranged to control the fifth set of finite filter coefficients.

91. The equalizer of claim 78 wherein the pre-processing coefficients are curved.

92. The equalizer of claim 78 wherein the pre-processing coefficients are curved substantially according to a function $1/(2-\cos(t))$.

93. The equalizer of claim 65 further comprising a spectral transformation applied to each data block upstream of the first, second, third, and fourth data shifters and the first, second, third, fourth, and fifth finite filter, wherein the spectral transformation is longer than a block of data.

* * * * *